United States Patent
Maluf et al.

(10) Patent No.: US 8,224,472 B1
(45) Date of Patent: Jul. 17, 2012

(54) ENHANCED PROJECT MANAGEMENT TOOL

(75) Inventors: David A. Maluf, Mountain View, CA (US); Chen-Jung Hsu, Fremont, CA (US); Hemil N. Patel, Sunnyvale, CA (US); Jairon C. Moh Hashim, Sunnyvale, CA (US); Khai Peter B. Tran, Alameda, CA (US)

(73) Assignee: The United States of America as Represented by he United States National Aeronautics and Space Administration (NASA), Washington, DC (US)

( * ) Notice: Subject to any disclaimer, the term of this patent is extended or adjusted under 35 U.S.C. 154(b) by 786 days.

(21) Appl. No.: 12/211,439

(22) Filed: Sep. 16, 2008

Related U.S. Application Data

(63) Continuation of application No. 10/928,874, filed on Aug. 25, 2004, now Pat. No. 7,596,416.

(51) Int. Cl.
*G06F 19/00* (2011.01)
*G06Q 10/00* (2012.01)

(52) U.S. Cl. ....... 700/97; 705/7.11; 705/7.12; 705/7.13; 705/7.14; 705/7.15; 705/7.16; 705/7.17; 705/7.22; 705/7.23; 700/99

(58) Field of Classification Search ............ 700/97, 700/99; 705/7.11, 7.12, 7.13, 7.14, 7.15, 705/7.16, 7.17, 7.22, 7.23, 7.28, 7, 11
See application file for complete search history.

(56) References Cited

U.S. PATENT DOCUMENTS

| | | | |
|---|---|---|---|
| 5,918,219 A | 6/1999 | Isherwood | |
| 6,237,915 B1 | 5/2001 | Ledet et al. | |
| 6,397,202 B1 | 5/2002 | Higgins et al. | |
| 6,675,127 B2 | 1/2004 | LaBlanc et al. | |
| 6,817,613 B2 | 11/2004 | Hasek | |
| 6,944,622 B1 | 9/2005 | Mitchell et al. | |
| 7,035,809 B2 * | 4/2006 | Miller et al. | 705/7.23 |
| 7,069,266 B2 | 6/2006 | Calderaro et al. | |
| 7,337,124 B2 * | 2/2008 | Corral | 705/7.17 |
| 7,627,493 B1 * | 12/2009 | Sarthi et al. | 705/7.22 |
| 7,818,250 B2 * | 10/2010 | Allin et al. | 705/38 |
| 7,937,281 B2 * | 5/2011 | Miller et al. | 705/7.11 |
| 2001/0049615 A1 * | 12/2001 | Wong et al. | 705/8 |
| 2004/0030590 A1 * | 2/2004 | Swan et al. | 705/7 |

(Continued)

OTHER PUBLICATIONS

Mastering Microsoft Project 2002; Courter et al., 117 pages; Copyright 2003 (only the pages that were cited, and therefore relied upon, in the rejection of the claims are being provided).*

(Continued)

*Primary Examiner* — Ronald Hartman, Jr.
(74) *Attorney, Agent, or Firm* — John F. Schipper; Robert M. Padilla

(57) ABSTRACT

A system for managing a project that includes multiple tasks and a plurality of workers. Input information includes characterizations based upon a human model, a team model and a product model. Periodic reports, such as one or more of a monthly report, a task plan report, a schedule report, a budget report and a risk management report, are generated and made available for display or further analysis or collection into a customized report template. An extensible database allows searching for information based upon context and upon content. Seven different types of project risks are addressed, including non-availability of required skill mix of workers. The system can be configured to exchange data and results with corresponding portions of similar project analyses, and to provide user-specific access to specified information.

22 Claims, 36 Drawing Sheets

U.S. PATENT DOCUMENTS

2004/0093244 A1* 5/2004 Hatcher et al. .................... 705/7
2004/0098300 A1* 5/2004 Karwatowski et al. ......... 705/11
2006/0053043 A1* 3/2006 Clarke ............................. 705/8
2006/0259338 A1* 11/2006 Rodrigue et al. ................. 705/7

OTHER PUBLICATIONS

Mastering Microsoft Project 2002; Courter et al.; 967 pages; Copyright 2003.*

* cited by examiner

View Aggregated Monthly Reports
-Reviewers can view all monthly reports on one page.

Jan Feb Mar Apr May Jun Jul Aug Sep Oct Nov Dec

2003 2004 2005 2006    Month: June    Year : 2004  View F

Monthly Report Check List
-Reviewers can view which months the reports have been submitted All Monthly Reports
-View / Submit your monthly reports.

| Monthly Reports | | Task Name | Cent | POC |
|---|---|---|---|---|
| 1 | 303.xls | Engineering for Complex Systems | | |
| 2 | 303-10-10.xls | System Reasoning and Risk Management | | |
| 3 | 303-10-01.xls | Systems Engineering Support | | |
| 3 | 303-10-20.xls | Risk Tol Suite | | |
| 4 | 303-10-21.xls | Risk Workstation | | |
| 4 | 303-10-22.xls | Mishap and Anomaly Information Systems | | |
| 3 | 303-10-30.xls | Core Risk Research | | |
| 4 | 303-10-31.xls | Model-Based Hazard Analysis | | |
| 4 | 303-10-32.xls | System Complexity Research | | |
| 4 | 303-10-33.xls | Risk Characterization and Visualization | | |
| 4 | 303-10-34.xls | Risk-Based Design and Optimization | | |
| 4 | 303-10-35.xls | Mishap and Anomaly Data Mining Research | | |
| 3 | 303-10-40.xls | Investigation Methods and Tools | | |

FIG. 5A

| [2] 303-20-10.xls | Knowledge Engineering for Safety and Success |
| [3] 303-20-01.xls | CIO |
| [3] 303-20-50.xls | Human and Organizational Risk Mgmt. |
| [4] 303-20-51.xls | Organizational Risk Perception and Mgmt. |
| [4] 303-20-52.xls | Operations Information Analysis |
| [4] 303-20-53.xls | Human and Organizational Risk Aspects of Distributed Collaborative Design |
| [3] 303-20-60.xls | Engineering Information Management |
| [4] 303-20-61.xls | Digital Shuttle |
| [4] 303-20-62.xls | Virtual Iron Bird |
| [4] 303-20-63.xls | Wire Integrity Research |
| [4] 303-10-64.xls | Sim Station |
| [2] 303-30-10.xls | Resilient Systems and Operations |
| [3] 303-30-01.xls | ECS L1 Activities |
| [3] 303-30-70.xls | Intelligent and Adaptive Operations and Control |
| [4] 303-30-71.xls | Applied Autonomous Aerospace Vehicle Technologies |
| [4] 303-30-72.xls | Autonomous Propulsion System Technology |
| [4] 303-30-73.xls | Adaptive Flight Control Research |
| [4] 303-30-74.xls | Human-Machine Interfaces |
| [3] 303-30-80.xls | Resilient Software Engineering |
| [4] 303-30-81.xls | High Dependability Computing |
| [4] 303-30-82.xls | Intelligent Software Engineering Tool Suite |
| [4] 303-30-83.xls | Intelligent Software Engineering Tool Suite - Risk Workstation |

*FIG. 5B*

Aggregated Monthly Reports

Report for the month of : 04/2004

| UPN/Title | Show Summary | Technical | Schedule | Budget | Management |
|---|---|---|---|---|---|
| 303-10-10/SRRM | Show/Hide | G | G | Y | G |
| 303-10-20/RTS | Show/Hide | G | G | G | G |
| 303-10-21/RW | Show/Hide | G | G | G | G |
| 303-10-22/MAIS | Show/Hide | G | G | G | G |
| 303-10-30/CRR | Show/Hide | G | G | Y | G |
| 303-10-31/MBHA | Show/Hide | G | G | G | G |
| 303-10-32/SCR | Show/Hide | G | G | G | G |
| 303-10-33/RCV | Show/Hide | G | G | G | G |
| 303-10-34/REDO | Show/Hide | G | G | G | G |
| 303-10-35/DAMA | Show/Hide | G | G | G | G |
| 303-10-40/IMT | Show/Hide | G | G | G | G |

TECHNICAL/MANAGEMENT COMMENT
   40/30 - The outreach group has finished digitizing the videos from the workshop is working
   on the website, with completion expected week of 10-May
   5/6 - An initial draft of the VIB book proposal has been completed and will be
   distributed for comment week of 10-May
Schedule Comment
   Behind in Schedule for corops, is to deliver a prototype VIB handbook in FY04. Slippage
   is 2 Months.
Budget Comment

Aggregated Monthly Reports

Report for the month of : 04/2004

| UPN/Title | Show Summary | Technical | Schedule | Budget | Management |
|---|---|---|---|---|---|
| 303-10-10/SRRM | Show/Hide | G | G | Y | G |
| 303-10-20/RTS | Show/Hide | G | G | G | G |
| 303-10-21/RW | Show/Hide | G | G | G | G |
| 303-10-22/MAIS | Show/Hide | G | G | G | G |
| 303-10-30/CRR | Show/Hide | G | G | Y | G |
| 303-10-31/MBHA | Show/Hide | G | G | G | G |
| 303-10-32/SCR | Show/Hide | G | G | G | G |
| 303-10-33/RCV | Show/Hide | G | G | G | G |
| 303-10-34/REDO | Show/Hide | G | G | G | G |
| 303-10-35/DAMA | Show/Hide | G | G | G | G |

Examples Of Risk Categories And Risk Sources Associated With A Project.

Technical risk

Failure of product to meet intermediate or final test during development

Failure to deliver an acceptable product

Delivery of an acceptable, but manifestly unreliable, product

Delivery of an acceptable product after agreed delivery date

Determination that contemplated product cannot work as required

Possible introduction by a competitor of a competing/superior product

Schedule risk

Failure to meet one or more ab initio milestones

Insertion of additional time period to allow investigation of unexpected
        intermediate result Unexpected change in milestone schedule Budget risk Failure to reach one or more ab initio schedule milestones within, or near to,
        an allocated budget increment Forced "borrowing" from a subsequent budget increment to respond to a
        present and unexpected problem Unexpected change in one or more budget increments allocated to different
        stages of product development Management risk Partial or complete unavailability of the required personnel to manage one or
        more stages of product development In-house or contractors skill mix Unavailability of critical development skills (because of retirement,
        departure, reassignment, illness, etc.) needed to meet milestone(s)

FIG. 16A

GENERAL INFORMATION

Title: Sim Station
Revision #: B
Task Lead:
Technical Lead:

Performing Organization: | Center | Code/Div | Branch Group | Number |

Funding Organization:
NASA Enterprise:
Lead Institution / Center:
Management Center #:
Cost Center:
OBS: 0-3.2.6 SIMS
WBS: 1-1-0
Fiscal Year: 2005

NASA RELEVANCE

Revelance to Enterprise: Low    Enterprises: U
Focus: Med    Enterprises: Y

*Fig.17A*

General Project / Task Information

Brief Description of Project / Task :
SimStation will demonstrate the concept of a Knowledge-Integrating Virtual Vehicle a tight integration of Knowledge from many sources to help engineers and managers better understand and manage the ISS an aerospace system near the limit of what can currently be designed and built. There are many tools for simulating and managing Station. SimStations place will be to help system engineers operations staff and managers develop a big picture understanding of vehicle design and operations trades and then bring that understanding to decision-making in a wide range of situations. This means knowing how the behavior of the whole arises from its parts what influences dominate in particular situations and what scenarios are close to a performance or safety constraint.

SimStation will integrate 1 a first-order simulation of ISS power generation storage electrical and thermal loads built with Dymola a COTS simulation tool based on the Modelica modeling language; 2 scenario exploration and simulation-explanation facilities that go extend modelica 3 representation and visualization of the 3D Objectives (Where you plan to go) :
The heart of SimStation is a first-order multi-subsystem model of Stations structure function and behavior. Structure includes the physical parts including their 3D geometry how they are connected and their spatial relationships derived from ISS program qualified CAD models schematics functional block diagrams and related data sources. Function refers to the roles parts play and the mission requirements they support. An important part of the effort for FY04 is to demonstrate the feasibility of pulling datasets from the current ISS Vehicle Master Database VMDB integrating them and organizing them so as to support the system thinking tools in SimStation. SimStation will integrate a subset of the VMDB to form a backbone to help link the remaining datasets

*Fig.17B*

Benefits/Impacts:

Having an virtual environment will lower the budget demand. No longer necessary to build a physical test environment.

Motivation (Reason for doing):

*FIG. 17C*

Teaming

Partners / Collaborators :

| Name | Center | Affiliation | Role | Email | Telephone |
|------|--------|-------------|------|-------|-----------|
|      |        |             |      |       |           |
|      |        |             |      |       |           |
|      |        |             |      |       |           |
|      |        |             |      |       |           |
|      |        |             |      |       |           |
|      |        |             |      |       |           |
|      |        |             |      |       |           |

Customers :

| Name | Center | Affiliation | Role | Email | Telephone |
|------|--------|-------------|------|-------|-----------|
|      |        |             |      |       |           |
|      |        |             |      |       |           |
|      |        |             |      |       |           |
|      |        |             |      |       |           |
|      |        |             |      |       |           |
|      |        |             |      |       |           |
|      |        |             |      |       |           |
|      |        |             |      |       |           |
|      |        |             |      |       |           |

Human Resources

*Resources

| Name | Center | Organization | Role | Email | % Time |
|------|--------|--------------|------|-------|--------|
|      |        |              |      |       |        |
|      |        |              |      |       |        |
|      |        |              |      |       |        |
|      |        |              |      |       |        |
|      |        |              |      |       |        |
|      |        |              |      |       |        |
|      |        |              |      |       |        |
|      |        |              |      |       |        |
|      |        |              |      |       |        |
|      |        |              |      |       |        |
|      |        |              |      |       |        |
|      |        |              |      |       |        |
|      |        |              |      |       |        |

*FIG. 18*

METRICS

Current Technology Readiness Level : 2
TRL Advancement (at End of Task) : 1
TRL Advancement Date (at End of Task) : End of FY05
Comments and/or Justifications on TRL : 
Fiscal Year when TRL 6 is Completed : 6

Minimum Exit Criteria:

The outcome by which you would measure the success of the work if all aspects of the desired outcome are not met.

RS Develop and demonstrate an integrated cross-subsystem quick look model of ISS system behavior for what-if analysis.
Model at least attitude control and self shadowing EPS power generation and aggregate electrical loads.
Demonstrate simulation and evaluation of function availability impacts and significant steady-state power management impacts.

Target Exit Criteria:
Target exit criteria is the desired outcome by which you would measure the success of the work proposed if all aspects of the desired outcome are met.

RS Develop and demonstrate an integrated cross-subsystem quick look model of ISS system behavior for what-if analysis.
Model at least attitude control and self shadowing EPS power generation thermal control and electrical loads.
Demonstrate simulation and evaluation of function availability impacts and significant steady-state power management impacts.

Fig. 19

Technologies Discipline Areas

*Information on this page is used to automatically update the NASA Technology Inventory Database (NTIDB). NTIDB provides a comprehensive accounting and description of NASA's overall technology investment, with reports based on technology discipline and application areas.*

| | |
|---|---|
| | Advanced Concept Analysis |
| | Aero & Aerothermodynamics |
| | Autonomy |
| ✓ | Avionics |
| |    guidance navigation and control |
| |    attitude determination and control |
| |    command and data handling |
| |    telemetry tracking and control |
| |    Entry_descent_precision landing |
| |    satellite system architecture |
| ✓ |      hardware |
| |      software |
| |    electronics |
| ✓ |      flight computers and components |
| |      microelectronics |
| ✓ |      photonics |
| |      radiation tolerance and hardening |
| | Biotechnology |
| | Communications |
| | Cryogenics |
| | EVA |
| | Education |
| | In-Space Manufacturing_Processing |
| | Information Systems |
| | Integration and test |
| | Instrumentation |
| | Instruments |
| | Life Support |
| | Medicine/Health & Performance |
| ✓ | Power |
| |    generation |
| ✓ |    storage |
| |    distribution and management |
| | Propulsion |
| | Robotics |
| | Space Environmental Effects |
| | Structures/Materials |
| | Systems Engineering |
| | Thermal Control |
| | Specific Technology |
| | Thermal Protection Systems |
| | Training Technology |

*Fig. 20A*

| Technologies Discipline Areas |
|---|
| Aeronautics technology |
| Space technology |
| Launch Vehicles |
| Constellations |
| Space Transfer Vehicles |
| Planetary Atmosphere/Surface Systems |
| Spacecraft/Platform |
| Special Categories |

FIG. 20B

| Deliverables | | | |
|---|---|---|---|
| Deliverables through the end of the task life | | | |
| ✦ Deliverable Title | Start | Due | |
| Sim Station Prototype | | | Add Personnel |
| Name | % involved | | Remove |
| Name | % involved | | Remove |
| Name | % involved | | Remove |
| Finalize Sim Station | | | Add Personnel |
| Market Sim Station | | | Add Personnel |
| Name | % involved | | Remove |
| Name | % involved | | Remove |
| Name | % involved | | Remove |
| | | | Add Personnel |
| | | | Add Personnel |
| | | | Add Personnel |
| | | | Add Personnel |
| | | | Add Personnel |
| | | | Add Personnel |
| | | | Add Personnel |

*FIG. 21*

Management Checklist (in 1K)      Estimate Uncertainty Level   100%

|                                    | Quantity |       | Total (K) |
|------------------------------------|----------|-------|-----------|
| Synchronization / Communications   |          | Hours | $0.0      |
| Negotiations                       |          | Hours | $0.0      |
| Planning / Concept Development     |          | Hours | $0.0      |
| Data Integration / Compilation     |          | Hours | $0.0      |
| Analysis / Evaluations             |          | Hours | $0.0      |
| Organizational / Project Design    |          | Hours | $0.0      |
| Information Dissemination          |          | Hours | $0.0      |
| Quality Control / Reviews          |          | Hours | $0.0      |
| Operations Management              |          | Hours | $0.0      |

Estimated Total Cost    $0.0

Theory/Experiments/Concepts Checklist (in 1K)   Estimate Uncertainty Level   100%

|                              | Quantity |                      | Total (K) |
|------------------------------|----------|----------------------|-----------|
| Literature Search Space      |          | Hours                | $0.0      |
| Experiment Design Complexity |          | High-3,Med-2,Low-1   |           |
| Brainstorming                |          | Hours                | $0.0      |
| Novelty                      |          | High-3,Med-2,Low-1   |           |
| Design                       |          | Hours                | $0.0      |
| Option Testing               |          | Hours                | $0.0      |
| Operations                   |          | Hours                | $0.0      |
| Analysis                     |          | Hours                | $0.0      |
| Review                       |          | Hours                | $0.0      |
| Reporting                    |          | Hours                | $0.0      |
| Deactivation / Disposal      |          | Hours                | $0.0      |
| Demonstrations               |          | Hours                | $0.0      |

Estimated Total Cost    $0.0

Logistics Checklist (in 1K)      Estimate Uncertainty Level   100%

|                          | Quantity |                  | Total (K) |
|--------------------------|----------|------------------|-----------|
| Supplies                 |          | Procurement Cost | $0.0      |
| Operators / Support      |          | Hours            | $0.0      |
| Site Costs               |          | Procurement Cost | $0.0      |
| Procurements / Contracts |          | Hours            | $0.0      |

Estimated Total Cost    $0.0

System Design Checklist (in 1K)   Estimate Uncertainty Level   100%

|              | Quantity |                      | Total (K) |
|--------------|----------|----------------------|-----------|
| Requirements |          | Hours                | $0.0      |
| Modeling     |          | Hours                | $0.0      |
| Evaluations  |          | Hours                | $0.0      |
| Refinements  |          | Hours                | $0.0      |
| Tests        |          | Hours                | $0.0      |
| Completion   |          | Hours                | $0.0      |
| V&V          |          | Hours                | $0.0      |
| Complexity   |          | High-3,Med-2,Low-1   |           |

Estimated Total Cost    $0.0

*FIG. 22A*

Software Checklist (In 1K)　　　　　　　　Estimate Uncertainty Level　100%

| | Quantity | Total (K) |
|---:|:---:|:---:|
| Development Line Count | _____ Hours | $0.0 |
| COTS Line Count | _____ Hours | $0.0 |
| External Interfaces | _____ Hours | $0.0 |
| Complexity | _____ Hours | $0.0 |
| Novelty | _____ High-3,Med-2,Low1 | |
| Generation Pedigree | _____ Hours | $0.0 |
| Technology Readiness Level | _____ 0-6 | |
| Planned Testing Levels | _____ Hours | $0.0 |
| Certification Process | _____ Hours | $0.0 |
| Development Techniques | _____ Hours | $0.0 |
| Centralized vs Decentralized | _____ Hours | $0.0 |
| Rapid Prototype | _____ Hours | $0.0 |

| Estimated Total Cost | $0.0 |
|---|---|

Hardware Checklist (In 1K)　　　　　　　　Estimate Uncertainty Level　100%

| | Quantity | Total (K) |
|---:|:---:|:---:|
| Complexity | _____ Hours | $0.0 |
| Custom Fabrication Process | _____ Hours | $0.0 |
| Planned Testing Levels | _____ Hours | $0.0 |
| Estimate Uncertainty Level | _____ Hours | $0.0 |
| Fabrication | _____ Hours | $0.0 |
| Generation Pedigree | _____ Hours | $0.0 |
| Technology Readiness Level | _____ Hours | $0.0 |
| Novelty | _____ High-3,Med-2,Low1 | |
| Number of Components | _____ Hours | $0.0 |
| Number of Interfaces | _____ Hours | $0.0 |

| Estimated Total Cost | $0.0 |
|---|---|

*FIG. 22B*

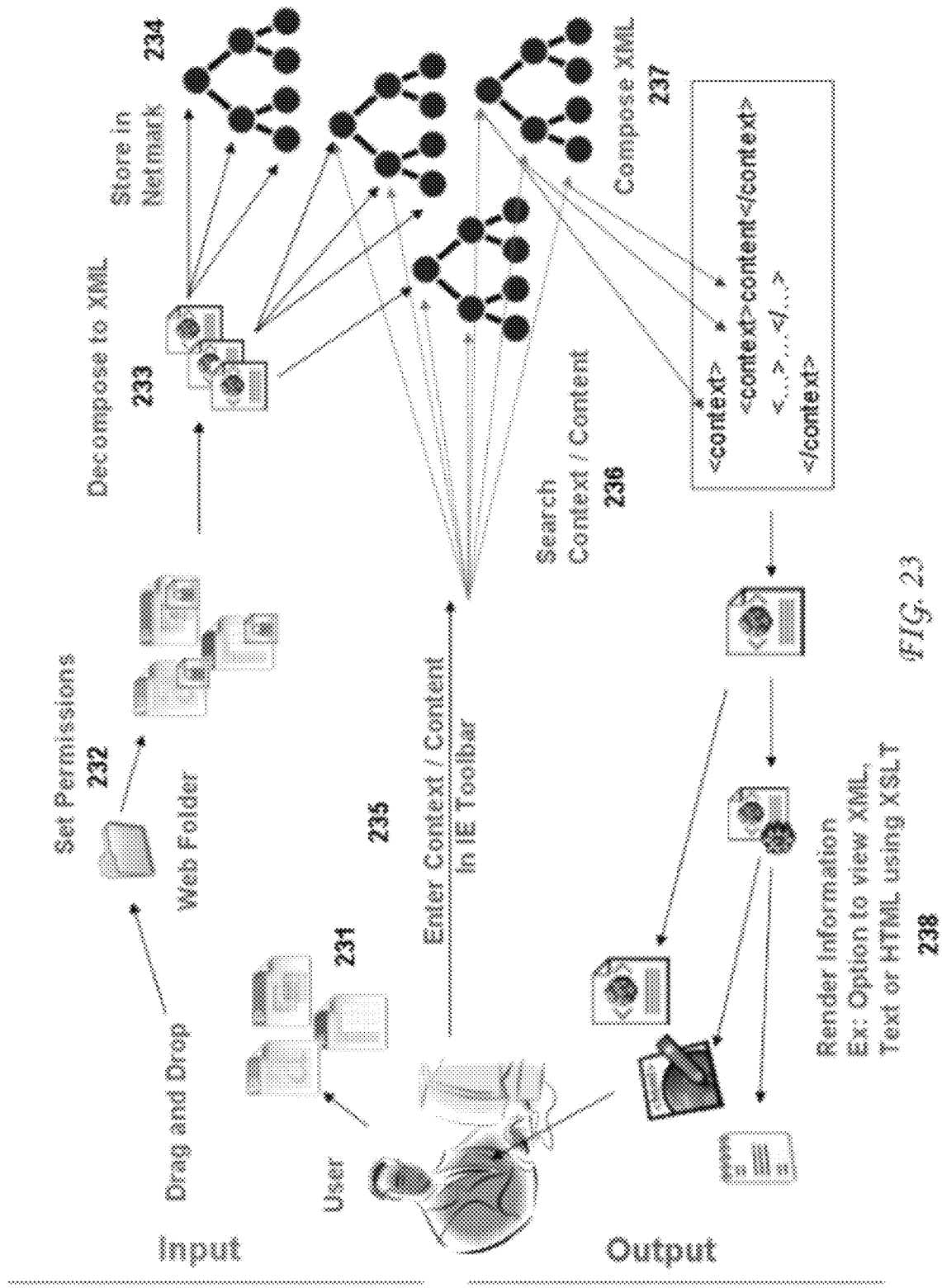

ENHANCED PROJECT MANAGEMENT TOOL

This application is a continuation in part of prior application Ser. No. 10/928,874, filed 25 Aug. 2004 now U.S. Pat. No. 7,596,417. This invention was made, in whole or in part, by one or more employees of the U.S. government.

The U.S. government has the right to make, use and/or sell the invention described herein without payment of compensation, including but not limited to payment of royalties.

ORIGIN OF THE INVENTION

1. Field of the Invention

This invention relates to a system for organizing, analyzing and presenting periodic status reports and future scenarios for management of a plurality of projects.

2. Background of the Invention

A complex project having many tasks and sub-tasks, many phases, and many workers will often require an evaluation of completion of the tasks and sub-tasks at several times during the project's duration. Initially and throughout the duration, suitability of the technical and inter-personal characteristics of the workers, managers and teams should also be evaluated. Suitability of the relevant skills and relevant work experience of the workers and managers for the proposed product should be evaluated initially to minimize the possibility of poor matches of these characteristics for the product to be developed. Information from a sequence of reports will be queried from time to time, by workers and managers involved in the project and by others who need the information. However, some information may be sensitive, and access to such information should be limited to specified persons.

What is needed is a system that allows a user to specify a type of report, to specify one or more classes of information within this type of report, to specify a time interval, to specify one or more projects, and to receive the status and/or comparisons of performance for the specified projects. Preferably, the system should provide a facility to fetch and incorporate information from specified external sources as well. Preferably, the system should provide for selective access to specified information, based upon user identity, user permissions and/or availability of the data sought.

SUMMARY OF THE INVENTION

These needs are met by the invention, which provides a system to receive, organize, analyze and track information and progress on a plurality of projects, and to periodically, on demand or at specified times, provide customizable status reports on selected activities performed on a selected group of these projects. This includes monthly reports, highlights of monthly reports, spreadsheet analyses, schedule management, assignment of risk in different categories (technical, schedule, budget, management, in-house work force/skill mix, contractor work force/skill mix, planned versus achieved goals, a possibility that a project (or an alternative to the project) will not produce a product (e.g., knowledge, hardware, software, a procedure, etc.) that will add to the useful store of resources for this user, and information obtained from What If simulations of possible future scenarios) for different tasks and activities and resource investments under a project. These risk management strategies include identification of technical, financial, management, and work force/skill mix milestones associated with a project, plus periodic reports on budgets and work force utilization.

The invention includes a searchable skill set module that lists (1) a name of each worker employed by the company and/or employed by one or more companies that contract to provide services for the company and (2) a list of skills possessed by each such worker. When the system receives a description of a skill set that is needed for a project, the skill set module is queried. The name and relevant skill(s) possessed by each worker that has at least one skill set forth in the received skill set list is displayed in a visually perceptible format.

The invention includes provisions for customizing, and linking where feasible, a subset of reports and accompanying illustrations for a particular user, and for adding or deleting other reports as needed. This allows a user to focus on the reports of immediate concern to him or her and to avoid sorting through reports and related information that is not of concern to the user.

Where one or more large data sets, or components thereof, are processed by the PMT, a tool bar is optionally provided for the user that links specified components and/or specified data sets that are related to each other. Spreadsheets, based upon Excel or another format and having up to $2^N$ cells ($N \leq 64$), are incorporated in the analysis and display operations.

The invention allows a PMT administrator to establish permissions (read, write, edit, delete) for a user for each report or related group of reports, preferably after consultation with, and agreement by, the user. Where the user has permission to write, to edit, to delete and/or to otherwise modify the text of a report, the user has an option to create a modified report, optionally labeled as "(title)/mod. date/user id." and to store and make further edits to this modified version. Optionally, each edited version of the original report is stored and labeled as such in the user's own memory space; but the original version of the report is also stored and is not replaced by any edited version.

Implementation of this separate-storage option would allow most or all users who have review-access to a document (read permission) to write, edit and otherwise modify the original version, by storing the modified version only in the user's own memory space. Where a user who does not have at least review-access to a report explicitly requests that report, the system optionally informs this user of the lack of review-access and recommends that the user contact the system administrator (name, phone number, e-mail address).

The system optionally stores preceding versions of a present report for the preceding N periods (N=1, 2, 3, . . . ) for historical purposes, where a period can be a quarter-year, a half-year, a full year, two years or any other reasonable time interval. A user can specify (1) a present report (by title, report group and/or report category) and (2) one or more preceding periods, and the system will retrieve and visually present the preceding reports (review-access only) and the present report for comparison or comparative analyses, if the specified preceding report has the same title or is a direct parent of the present period report. If the present period report has no direct parent, the system will present the names of one or more preceding period reports that have substantial subject overlap with the present period report and will offer the user an option to retrieve one or more of the preceding period reports for similar analyses. The comparative analyses includes an ability to retrieve and reformat numerical data for a contemplated comparison.

The system optionally facilitates tool-to-tool (or database-to-database) queries by providing a lexicon of categories, groups within categories, and individual subjects within reports, with each such lexicon listing having a link to a separate dictionary that briefly describes one or more reports corresponding to each listing and optionally indicates the relationship of these reports to each other. Where a user has use access to the subject invention (PMT) for a particular project and has use access to another, similar tool from the same or another vendor for the same project, the user can query the PMT lexicon from the other tool and obtain review-access of corresponding information, for purposes of comparative analyses. The similar tool from the other vendor would need to be formatted (1) to present authentication and authorization for review-access to PMT, (2) to query the PMT lexicon and (3) to call up and interactively display the corresponding PMT report(s). However, the subject invention provides a lexicon and the linking capability for a user to query PMT from another the perspective of another tool.

The system also provides a lexicon for user-defined labels/referents for an illustration or a section of text, where two or more users may refer to the illustration or the section of text by different, but corresponding, names. A user enters a label (optionally customized) into a label lexicon, and (different) labels used by others to refer to the same illustration or text appear on a screen, together with an identification of the user who has adopted the different label.

The system provides one or more test cases for a user in one or more categories of utilization, where a test case can be run before launching the application or in mid-stream to check on proper functioning of the PMT during its use phase. Choice of a test case in a particular category will cause the system to test and interactively report to the user any anomalous results of computations, comparisons or image presentations that occur as the test case is run. The test case results are reported on screen and/or in hard copy format. Optionally, only the anomalous results, rather than all results, are reported, using an exception reporting approach Data and procedures for a test case in a selected category are downloaded from a server.

Optional security procedures allow the data used, and the results of individually selected processing by the PMT, to be confidentially maintained and separately stored, through imposition of user permissions (read, write, edit, analyze, display, etc.), including information obtained through the Internet.

The PMT system implements Earned Value Management analysis of a project, beginning with a planned value (PV) parameter, an actual cost (AC) parameter and a cumulative earned value (EV) parameter that reflect performance at different stages of a project.

The PMT may be used as a flexible front end processor, by gathering data processed and stored by a larger computer system that may be less flexible in data call-up and further processing than is the PMT.

The system integrates a human model (optionally including personality assessment; worker skills, such as tools used, and processes known; worker experience and assigned tasks; and present workload), a product model (optionally including technical readiness level (TRL) range, product pedigree; technologies involved; components; interfaces; life cycle phases; and profile of present or anticipated customers), and a team model (optionally including ratios of managers-to-technical workers and introverts-to-extroverts; skill set coverage; teamwork experience; morale; team structure; team autonomy; team flexibility; and risk attitudes).

BRIEF DESCRIPTION OF DRAWINGS

FIG. 2B graphically compares financial return for a baseline curve B1 with an estimated curve B2 of financial return for a proposed alternative project.

FIG. 5 is a representative list of periodic (here, monthly) reports that can be regularly prepared and viewed according to an embodiment of the invention.

FIG. 8 illustrates an interactive screen for calling up status information on a specified task.

FIG. 16 illustrates an interactive screen for assessing specified risks associated with a task or project.

FIG. 16A illustrates different categories of risk, and some sources of such risks, associated with a project.

FIGS. 17A, 17B, 17C and 18 illustrate interactive screens for input of task plan information into the system.

FIG. 19 sets forth some metrics, or measures of performance, that can be used to evaluate the development of the project or tasks within the project.

FIGS. 20A-20B set forth some representative technology areas that might be of concern for a given project and may include an assessment of the scope and depth of human resources available to cover these technologies.

FIG. 21 sets forth deliverables associated with completion of the project or tasks within the project.

FIGS. 22A-22B illustrate management check lists for estimating time and dollars required to perform several groups of related tasks.

FIG. 23 schematically illustrates user input and output according to the invention.

DESCRIPTION OF BEST MODES OF THE INVENTION

Figure 1:
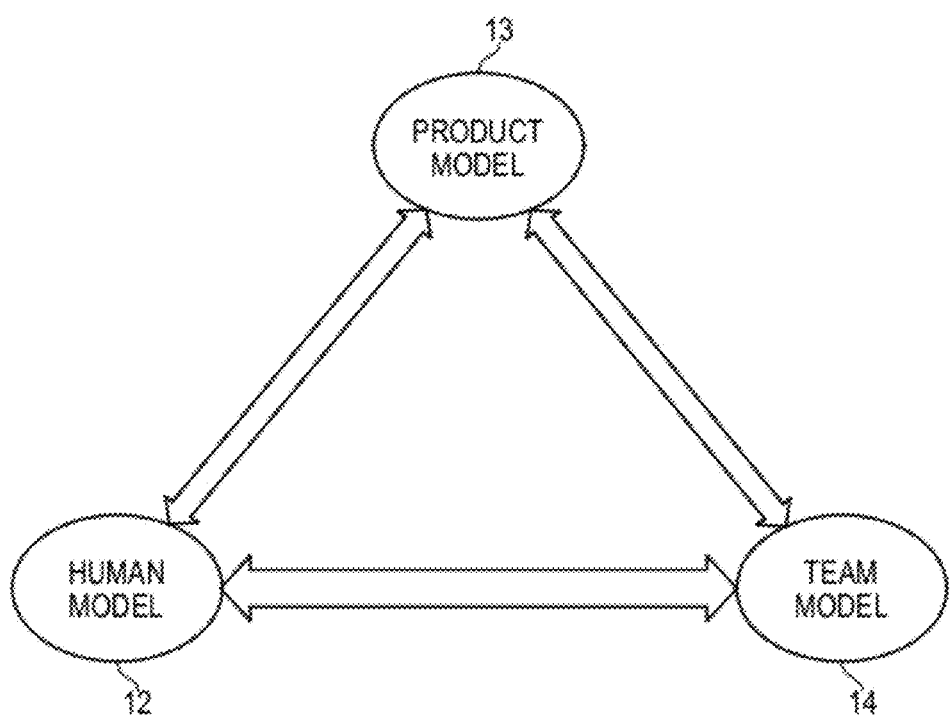
FIG. 1 schematically illustrates interaction of a human model, a product model and a team model according to the invention.

Assume that a group of M projects, numbered $m=1, \ldots, M$ ($M \geq 1$) is being pursued within an organization. The status of various activities associated with each project will be reported at specified intervals, in periodic reports, referred to herein as "monthly reports" for convenience. Subsidiary reports at shorter time intervals (e.g., daily, weekly, biweekly, etc.), as well as collective reports at greater time intervals (e.g., quarterly, semi-annual, annual, bi-annual, etc.), can also be made. In order to analyze, track and obtain the desired information, the system integrates three models of contributing subsystems, as illustrates in FIG. 1: a human model 12, a product model 13 and a team model 14 for each project handled by an entity, according to an embodiment of the invention. Here "product" refers to a physical good or service or to an object of the project.

The human model 12 optionally includes, for each worker having at least some responsibility for a specified project: worker location and place within the entity; worker personality, as assessed by a personality test (e.g., Meyer-Briggs); worker morale; worker flexibility; relevant worker skills (tools and equipment used, techniques used and processes known); worker experience (roles played in past and present assignment(s), types of products worked upon, and previous tasks and performances); presently assigned tasks; and present workload.

The product model 13 optionally includes: a TRL range; a product "pedigree" (extensions of existing r&d versus totally new exploration or innovation); technologies involved, if any, in the product; components required; interfaces required; life cycle of product; maturity of product; profile of present or contemplated customers (estimated number of customers and of market, types of customers, and estimated customization or variety required).

A Technology Readiness Level (TRL) is a multi-level value assigned to a (proposed) product, based upon its present state of development. The higher the assigned value, the closer the product is to use in a real environment and for its contemplated function. In one version, a TRL includes nine levels: (1) basic principles of a product are observed and reported; (2) concept and/or application of product is formulated; (3) analytical and experimental critical function(s) and/or characteristics of product are determined to be feasible; (4) component or subsystem or system is validated by a breadboard, if appropriate, in a laboratory environment; (5) component or subsystem or system is validated by a breadboard in a relevant environment; (6) prototype of component or subsystem or system is prepared; (7) system prototype is demonstrated in a relevant environment; (8) actual system is qualified through tests and demonstrations; and (9) actual system is successfully tested many times in a real environment.

The team model 14 optionally includes: a ratio of managers to operational workers; a ratio of introverts to extroverts; skill set required and skill set available for project; types of operational workers required; team experience working together; estimated team morale; centralized versus decentralized structure of the team; estimated kevel of autonomy; estimated flexibility of individual team members; and individual and collective attitudes toward risk.

Each of the three models provides a collective perspective on project resources and interactions between these resources. The human model 12 provides relevant perspectives on individual workers, substantially independent of presence or absence of one or more other workers. The team model 14 is closely integrated with the human model and provides assessments of interactions between an individual and other team members. The product model 13 is less closely integrated with either of the other models and indicates or assesses interpersonal skills that are required to implement or complete the project.

As a first example of use of the information in these models, a first earlier-developed product may have used a first ratio $\rho 1$ of introverts to extroverts among the workers and managers and may have required a first time interval of length T1 to initiate, develop and complete; and a second earlier-developed product (similar in scope to the first product) may have used a first ratio $\rho 2$ of introverts to extroverts among the workers and managers and may have required a second time interval of length T2 to initiate, develop and complete. If the duration T2 is substantially smaller than the duration T1, in a subsequent project to develop a similar product, the present ratio $\rho$ of introverts to extroverts for this subsequent project should, ceteris paribus, be closer to $\rho 2$ than to $\rho 1$.

As a second example of use of the information in these models, a first earlier-developed product may have used a first "mix" (M1,TW1,CA1,SA1) of M1 managers, TW1 technical workers (scientists, engineers, etc.), CA1 computer applications specialists and SA1 support and administrative workers (accountants, finance specialists, legal practitioners, etc.) (full time equivalents) and may have required a first time interval of length T1' and a cost of $C1 to initiate, develop and complete. A second earlier-developed product (similar in scope to the first product) may have used a second "mix" (M2,TW2,CA2,SA2) of M2 managers, S2 technical workers, CA2 computer applications specialists and SA2 support and administrative workers and may have required a second time interval of length T2' and a cost of $C2 to initiate, develop and complete. If T1' is substantially the same as T2' and $C1 is substantially less than $C2, in a subsequent project to develop a similar product, the "mix" for this subsequent project should, ceterus paribus, be closer to (M1, TW1, CA1, SA1) than to (M2,TW2,CA2,SA2).

Figure 2:
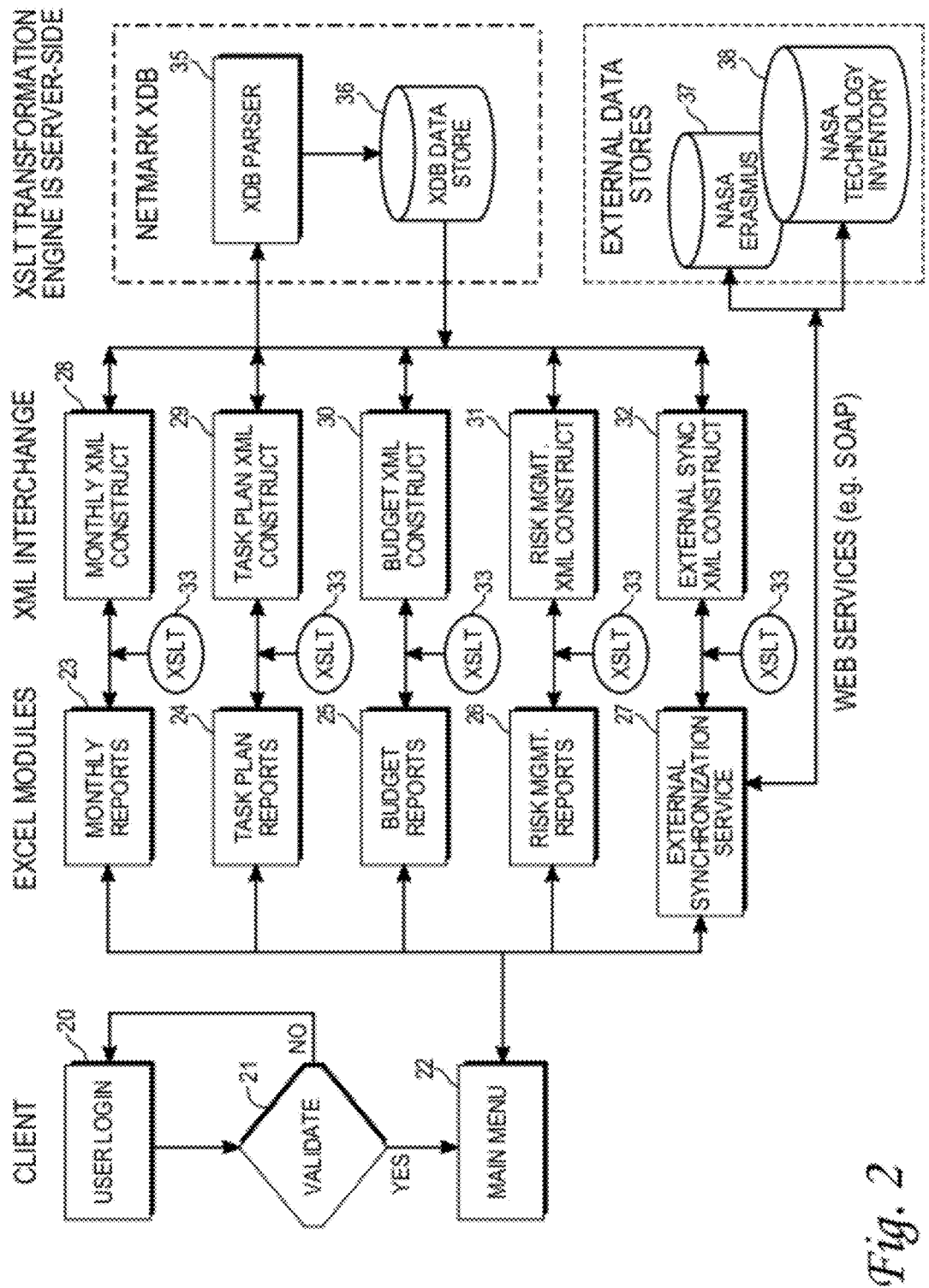
FIGS. 2 and 3 schematically illustrate suitable system architectures according to the invention.

FIG. 2 schematically illustrates a high level view of use of the invention in one embodiment. A system user or client enters a login sequence in step 20, and the system front end attempts to validate the sequence, in step 21. If the login sequence cannot be validated, the system informs the user that validation is declined and returns to step 20. After a selected number of login failures (e.g., three) the system optionally informs the user of this failure, optionally reports this sequence of failures, and optionally deactivates this login module for a selected time interval (e.g., ten minutes, one day or one week). If the login sequence is validated, in step 21, the system provides a main menu for the user, in step 22. The user selects one or more among as many as six types of reports, each of which behaves similarly to an Excel module: a Monthly Report (step 23), a Task Plan Report (step 24), a Schedule Report (step 24A), a Budget report (step 25), a Risk Management report (step 26) and an external services synchronization report (step 27). The external synchronization services report requested in step 27 optionally uses Web services to respond to this request.

Using Extensible Markup Language (XML) or another suitable language a Monthly Report is constructed (step 28), a Task Plan Report is constructed (step 29), a Schedule Report (step 29A), a Budget Report (step 30), a Risk Management Report (step 31) and/or an external services synchronization report (step 32) is constructed, corresponding to the client selection in step 22. A software module 33, labeled XSLT (extensible stylesheet language transformation), provides a translation between the language(s) (e.g., XML) used in the report construction steps 28-32 and the user-requested format for providing the reports in steps 23-27.

Construction of the report or plan, as in step 28, 29, 29A, 30, 31 and/or 32, uses a Netmark parser 35, or an extension thereof, that provides content searching and/or context searching and is substantially disclosed in patent application U.S. Ser. No. 10/232,975, which is incorporated by reference herein. An extended Netmark parser 35 searches a data store module 36 and either identifies one or more locations within the data store module that satisfies the request, or returns the information specified in the request (steps 23, 24, 25, 26 and/or 27).

In a Monthly Report, a project manager reports the status of each of a specified set of tasks and optionally assesses the present status, versus the originally projected status, of each of these tasks at the time of reporting, optionally including the number of FTE operational workers presently working on each task. In a Task Plan Report, more detail is provided for each of the specified tasks, and a client can view and perform some analysis on these tasks. A Schedule Report provides detail on anticipated versus actual completion of project stages.

In a Budget Report, a project manager compares a projected budget with accumulated expenditures for each of the specified tasks and optionally provides an estimate of expenditures required to complete each of these tasks. Within the Budget Report, a collection of graphical charts and accompanying tabular format presentations is available showing: full cost summary, civil servant full time equivalent (FTE; hours or other time units), civil servant labor dollars, travel costs, allocated burden or overhead (G&A), and N.A.S.A. money expended for each manager and for each operational worker.

In a Risk Management Report, a manager indicates the risk(s) that have been accepted, or are proposed to be accepted, to complete each specified task, for review and approval or disapproval of acceptance of such risk(s) and for review of suitable risk mitigation measures. Each specified task optionally has associated therewith: a technical perspective (e.g., percent completed and performing as required; milestones met); a schedule perspective; a budget perspective; a management perspective; a work force/skill mix for the in-house workers; a work force/skill mix for workers employed by the contractors, if any, for the project; a goals perspective (planned goals versus achieved goals); a possibility that a project will not produce an acceptable product (e.g., knowledge, hardware, software, a time varying requirements schedule) that will add to the resources of the company; and a What If simulation perspective (examination of possible future scenarios, including alternative investments of resources for project completion and for growth). A color coded dialog button indicates the present degree of risk (e.g., green, yellow and red, corresponding to low, moderate and high risk, respectively) that this task will not be completed as originally projected.

Figure 2A:
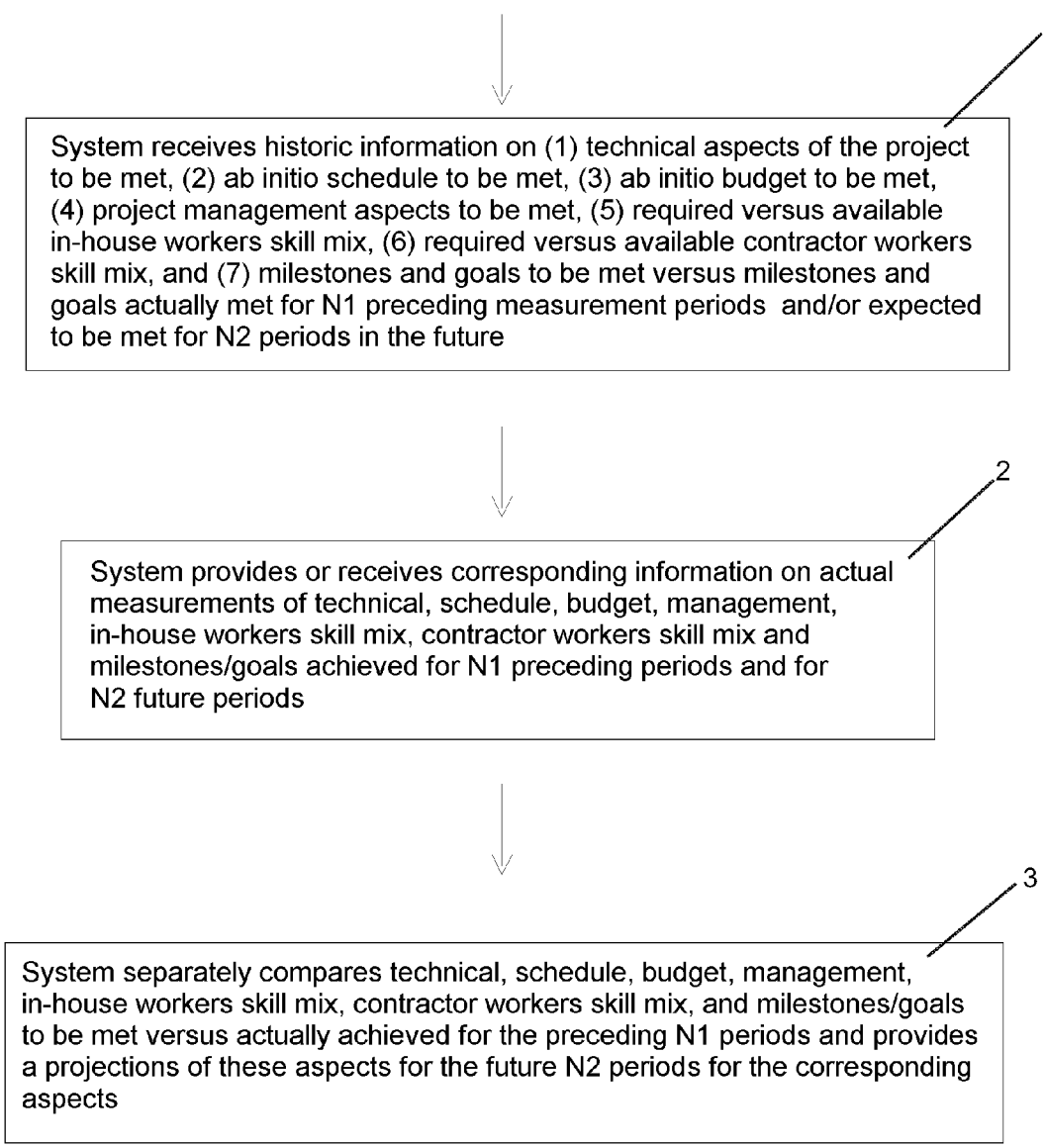
FIG. 2A is a flow chart of a procedure for providing a Risk Management Report.

FIG. 2A is a flow chart indicating a procedure for providing a Risk Management Report according to one embodiment of the invention. In step 1, the system receives historic information on (1) technical aspects of the project that were to be met, (2) an ab initio schedule (e.g., a sequence of milestones) that was to be met, (3) an ab initio budget that was to be met, (4) project management aspects that were to be met, (5) required in-house workers' skill mix versus available in-house skill mix, (6) required contractor(s) workers skill mix versus available contractor(s) skill mix, and (7) milestones and goals expected to be met versus milestones and goals actually met, for N1 preceding periods for the project, including the present period (N1$\geq$3), and/or expected to be met for N2 projected periods in the future (N2$\leq$1). In step 2, the system provides or receives corresponding information on actual measurements of the technical schedule, budget, management, in-house workers skill mix, contractor(s) workers skill mix aspects, and milestones/goals achieved or to be achieved for the preceding N1 periods and for the future N2 periods. In step 3, the system separately compares the technical, schedule, budget, management, in-house workers skill mix, contractor(s) workers skill mix and milestones/goals aspects to be met versus actual performance for the preceding N1 periods for the corresponding aspects and provides a linear or nonlinear projection of these aspects for the future N2 periods for the corresponding aspects.

The invention includes a searchable skill set module that lists (1) a name of each worker employed by the company and/or employed by one or more companies that contract to provide services for the company and (2) a list of skills possessed by each such worker. When the system receives a description of a skill set that is needed for a project, the skill set module is queried. The name and relevant skill(s) possessed by each worker that has t least one skill recited in the received skill set list is displayed in a visually perceptible format. Optionally, for each worker the skill set module includes: (i) worker name; (ii) skill or related group of skills; (iii) depth of the skill (e.g., number of years working experience applying the skill; (iv) source of the skill (e.g., training, education, apprenticeship, self-learning); (v) reinforcement and/or update training, and dates thereof, received by the worker; and (vi) examples of projects in which this worker has applied this skill in preceding projects.

With reference to the skill set module, a lexicon of skills is preferably presented, based on individual activities, not on a task that may involve a roll-up or integration of different tasks. For example, a list of software tasks may include: programming experience in individual languages, such as C++, Java, Linux; interactive presentation in HTML, XML, VBA, etc.; topical applications (financial, technological, scientific, narrative, etc.); query-based searching; icon-based searching and linking; database architectures. Depth of skill may be objectively assessed, for example, by number of full-time equivalent months spent in a target activity, or in approximate number of lines of code written for each project, or in time-weighted numbers of programmers managed by the person being evaluated. Reinforcement and/or update training can be evaluated in terms of: training level (entry, intermediate and advanced levels); in terms of the time spent, measured in hours, in the training; in terms of relevance of training to the present activity(ies) or present task(s), measured on a scale of 1–N (N=3, . . . , 6); and/or in terms of frequency of training in this technical area attended by the worker (e.g., P times in Q years). Preferably, the needed skill set is related to contemplated activities, which allows a more detailed characterization than does an assessment based on one or more contemplated tasks, each of which will involve several activities.

Depth of a skill may also be evaluated in terms of worker efficiency, based on previous activities in which a given skill has been used. This may include: a comparison of the FTE time required by the worker to complete an activity, with FTE times required by other worker's for a similar activity (objective); cooperativeness and flexibility of this worker in dealing with other workers in previous activities (subjective); demonstrated willingness of the worker to "stretch" his/her experience and innovativeness to cover a related activity that the worker has not yet confronted before (subjective).

What If simulations of alternative future scenarios include consideration of different tasks, different activities and different resource investments. What If simulations of alternative investments for project completion and/or for growth in scope or capacity of technical/management work. Alternative investment involves (1) additional cost ($\Delta C$), due to time delay ($\Delta t$) and/or additional expenditure; (2) time delay associated with alternative; (3) additional economic return and/or non-economic return (ΔR); and (4) foregone alternative opportunities. Costs and returns are discounted over time, using an inflation factor.

One important class of What If simulations involves evaluation of the results of alternative investment of specified resources (i) to assist in completing a project and (ii) to promote growth in the user's capacity and/or scope of work for future projects. An investment of a resource in meeting a milestone for, or completing, a project is relatively straightforward to evaluate: the cost of use of, and extent of use of, this resource are known from present data. An investment of a resource to promote growth in capacity or in scope of work performed will involve a cost of foregone opportunities and a cost (−C) of resource consumption for the alternative purpose (initially having negative impact on a budget), followed (it is hoped) by a increased return (+R) over and above a return that would be available without this alternative investment. Where a specified resource is diverted from a present project to investment in a "future" project, the present project may experience a time delay in completion, and a cost associated with this time delay should also be accounted for.

This evaluation is illustrated in FIG. 2B, showing a baseline curve B1, corresponding to no-alternative-investment (business as usual), and an alternative curve B2 with an associated initial cost (−C, an area between the first curve component B2-1 and the baseline curve B1) and with an associated follow-on return (+R, an area between the second curve component B2-2 and the baseline curve B1). Quantitative estimates of corresponding dollar amounts corresponding to the initial cost −C ($\leqq 0$) and to the follow-on return +R ($\geqq 0$) are often difficult to make, especially if the time interval (relative to the present time) for the follow-on return +R cannot be estimated accurately.

The baseline curve B1 and the alternative curve B2 in FIG. 2B represent economic or financial return as a function of time, with at least two associated metrics: an initial incremental cost (−C) associated with the alternative project and an ultimate return (+R) associated with the alternative project, vis-à-vis the present business-as-usual approach. The ordinate or y-axis can also represent a return that is not expressed directly in economic terms: for example, an environmental return ER, expressed as an aesthetic metric or as a savings metric representing estimated incremental clean-up costs or estimated incremental health costs avoided due to an improved local environment; a health environment return HR, expressed as a quality of life metric or as a health savings metric representing estimated direct medical costs (including pharmaceutical costs) avoided due to a healthier or more alert local population; a socio-psychological return SPR, expressed as a metric representing decreased estimated mental health and crime investigation and prosecution costs; an innovation return INR, expressed as a metric representing enhanced gross domestic product (GDP) arising from improved technological innovations that are made available earlier than would otherwise occur; and/or an energy economics return EER, expressed as a metric representing energy or financial resources invested in a new or different energy generation facility that will produce new energy at higher efficiency and lower ultimate cost. A baseline curve and an alternative curve are again provided, varying with time, and an area between the two curves provides a metric representing initial incremental costs (area<0) and representing incremental return (area>0) of the alternative project vis-à-vis business-as-usual. The curves represent estimates and may need to be revised as subsequent and more accurate data become available.

A discounted time value for this follow-on return is sometimes used to account for the fact that a dollar return, delayed in time by a few months or years, is worth less than the same dollar return, received today. This approach is used, for example, in evaluating a proposed (addition to) energy project, such as a fossil fuel or alternative energy project, by computing time value return ("TVR") for the proposed investment, and can be expressed as $$TVR(i) = \sum_{n=0}^{N} \{-C_n + R_n\}/(1+i)^n, \tag{1}$$

for N consecutive time intervals of substantially equal length, where $-C_n$ is a cost (resource consumption) associated with period no. n, $+R_n$ is a positive return on this investment associated with the period no. n, and i is an interest rate (assumed constant for convenience) associated with each of the periods. An economic cost of time delay is accounted for through incorporation of the interest factors $(1+i)^{-n}$. Accounting for lost opportunity cost requires a subjective assessment. Another approach computes an internal rate of return ("IRR") for an investment, an inferred interest rate i0 for which a computed time value return $$CTVR(i0) = \sum_{n=0}^{N} \{-C_n + R_n\}/(1+i0)^n = 0, \tag{2}$$

In effect, the IRR interest number i0 is an imputed interest rate that would need to be present in order that the proposed investment have a neutral effect on time value return TVR. Where, as usually occurs, the early years of a proposed project have a negative return (resource costs exceed economic return) and the succeeding years have a more or less positive return, a higher IRR is usually preferred to a lower IRR for the same project. One can also compare an IRR for each of two or more proposed projects to estimate which project is more favorable (or less unfavorable): ceteris paribus, the project with the highest IRR, requiring a higher market interest rate before the project slips below breakeven, is likely to be a better investment, if other considerations are not supervening.

A What If simulation can also be used to estimate whether a present use of resources (k=0), or any alternative use k=1, ..., K (K$\geqq$1) of these resources, is preferable. One method of implementing this estimation is to determine an IRR imputed interest rate i0(k) for each project k (k=0, ..., K) and compare this rate with a projected average interest rate i(avg) for a specified time interval in the future. Where i0(k0) is much larger than i(avg) for a contemplated project, this project should be seriously considered, especially if i0(k0) >i0(k)(k≠k0). Where i0(k) is no greater than i(avg), this project is less attractive, absent other considerations, such as development of new capabilities that otherwise could not be developed.

Figure 2C:
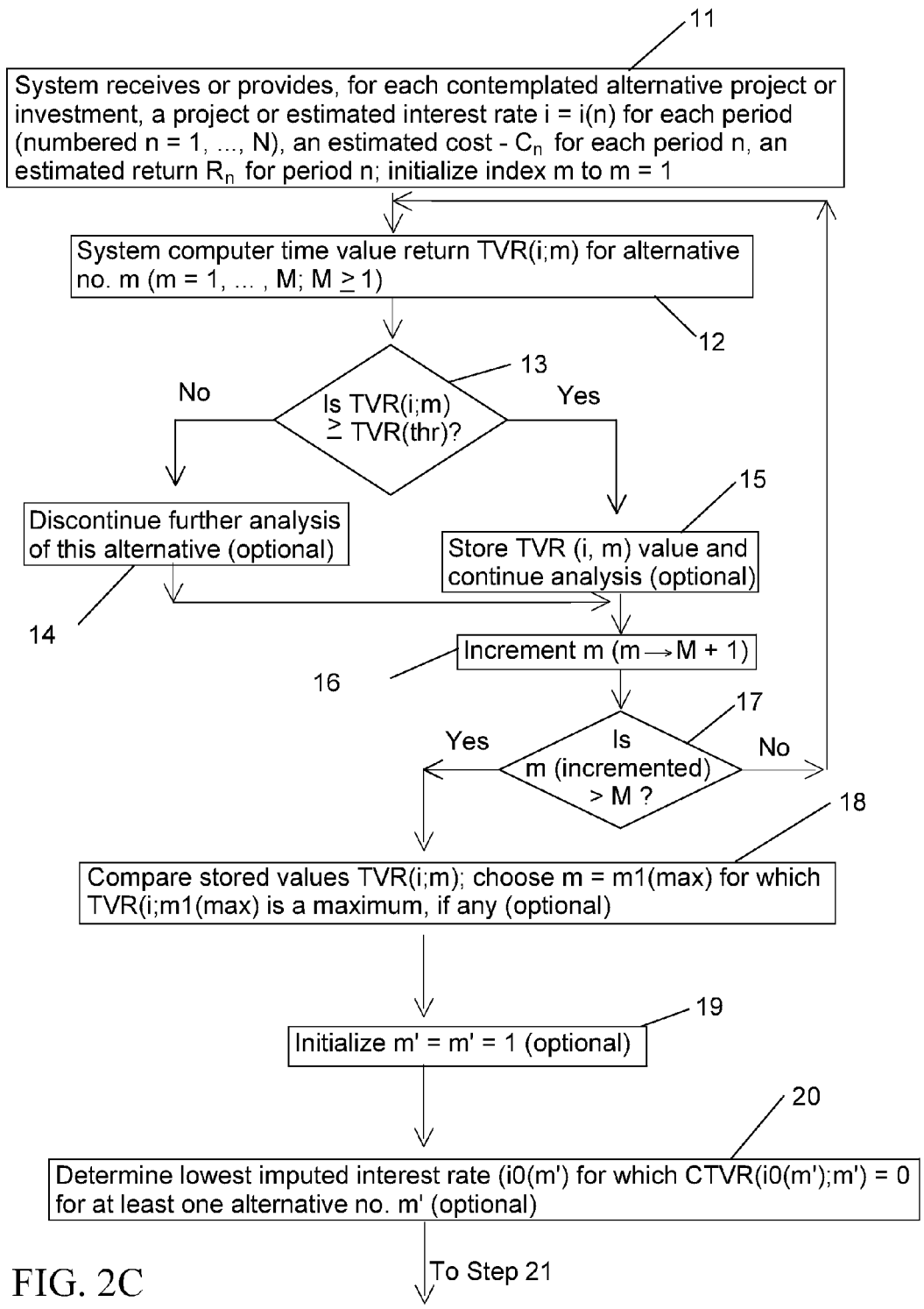
FIGS. 2C and 2D are a flow chart of procedures for performing a What If analysis.

FIG. 2C is a flow chart of different embodiments of procedures for performing a What If analysis or simulation according to an embodiment of the invention. In step 11, the system receives or otherwise provides, for each contemplated alternative project or investment (numbered m=1, ..., M; M$\geqq$1), a projected or estimated interest rate i for each period (which may be the same, or may be different, for each period), an estimated cost $-C_n$, ($\leqq 0$) for period no. n (n=1, ..., N), and an estimated return $R_n$ ($\geq 0$) for the period no. n, and initializes an index m (m=1). In step 12, the system computes the time value return TVR(i;m), as set forth in Eq. (1). In step 13 (optional), the system compares TVR(i;m) with a selected threshold value TVR(thr) to determine if the contemplated investment should be considered further. If the answer to the query in step 13 is "no," the system optionally discontinues further consideration of this investment, in step 14. If the answer to the query in step 13 is "yes," the system stores the value TVR(i;m) for the contemplated investment no. m, in step 15, and increments m(m→m+1), in step 16. In step 17, the system determines if m(incremented) is >M.

If the answer to the query in step 17 is "no," the system returns to step 12. If the answer to the query in step 17 is "yes," the system moves to step 18 and compares the stored values TYR(I; m) and chooses the investment no. m=m1(max) for which TVR(i;m1(max)) is a maximum, if any m1 can be found (optional).

$$\text{TVR}(I;m1(\max)) = \max_m\{\text{TVR}(I;m|m=1,\ldots,M\} \tag{3}$$

In step 19, an index value m' is initialized (m'=1). In step 20, the system determines a (highest) imputed interest rate i0(m) that causes the computed time value return CTVR(i0(m'); m')), set forth in Eq. (2), to be 0. For a complex return, wherein the net return, $-C_n(m)+R_n(m)$, changes sign several times, more than one imputed interest rate i0(m') may satisfy CTVR(i0(m'); m')=0.

In step 21, the system provides a projected interest rate i(proj) (optional). In step 22, the system determines whether i0(m')≧i(proj). If the answer to the query in step 22 is "yes," the system optionally discontinues further consideration of the contemplated investment no. m, in step 23. If the answer to the query in step 22 is "no," the system optionally continues to analyze the contemplated investment no. m', in step 24. In step 25 the system optionally chooses an investment no. m'=m2(max) for which $$i0(m2(\max)) = \max\{i0(m')|m'=1,\ldots,M\}. \tag{4}$$

Figure 2D:
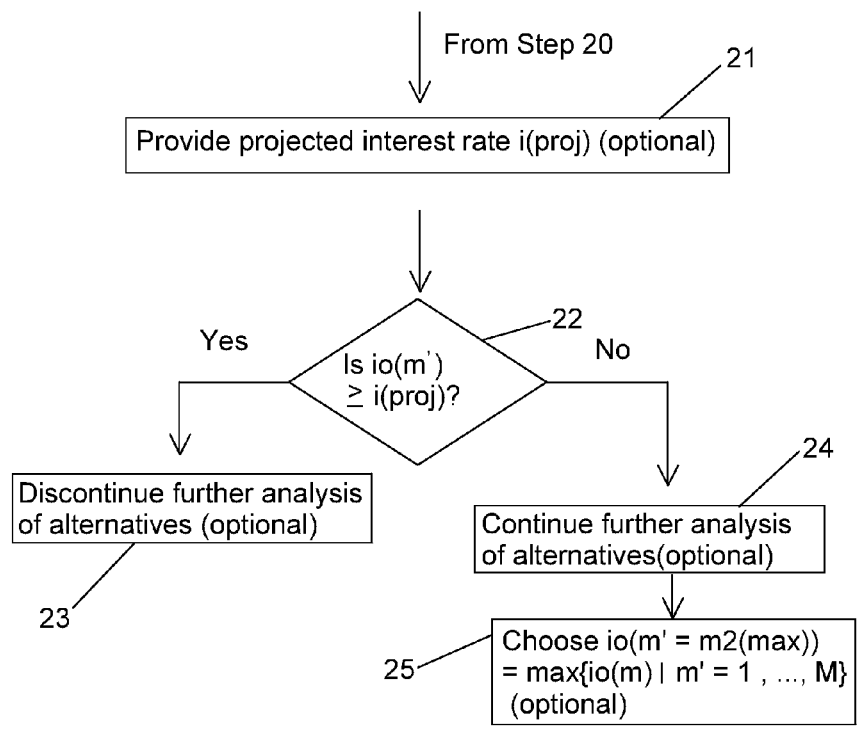

Optional steps in the flow chart in FIGS. 2C and 2D may be selectively included or excluded, depending upon the particular investment analysis to be performed.

Where an alternative project or investment is considered, the associated risks for one or more of the risk factors technical, schedule, budget, management, work force/skill mix, and/or planned goals versus actual goals may shift from a lower estimated risk category (e.g., green or yellow) to a higher estimated risk category (e.g., yellow or red). In a simple approach, a metric value or weight w(r) assigned to each risk category (e.g., green with r=1, yellow with r=2 and red with r=3) is the same and is the same for each risk factor (p). In an enhanced approach, a possibly different weight value w(r;p) is assigned for each risk category r and for each risk factor p, subject to a constraint such as $$w(r=1;p)+w(r=2;p)+w(r=3;p)=C \text{ (e.g., } C=1), \tag{5}$$

and the weighted risks are compared, for each risk factor, for a baseline investment of resources and for one or more proposed alternative projects involving diversion of some resources. If, for a given baseline project and alternative project, the corresponding probabilities that the risk factor is r (=1, 2, 3) are Pr(r;RF;base) and Pr(r;RF;alt) for a risk factor RF, the weighted risk numbers WR for the risk factor RF become $$WR(RF; \text{baseline}) = \sum_{r=1}^{3} Pr(r; RF; \text{base})w(r; RF; \text{base}) \tag{6}$$

$$WR(RF; \text{alternative}) = \sum_{r=1}^{3} Pr(r; RF; \text{alt})w(r; RF; \text{alt}). \tag{7}$$

Optionally, the weighted risk numbers WR(RF;baseline) and WR(RF;alternative) are compared to estimate which project (baseline or alternative) is preferable for this risk factor RT, with the project having the lower WR value being preferred.

Figure 3:
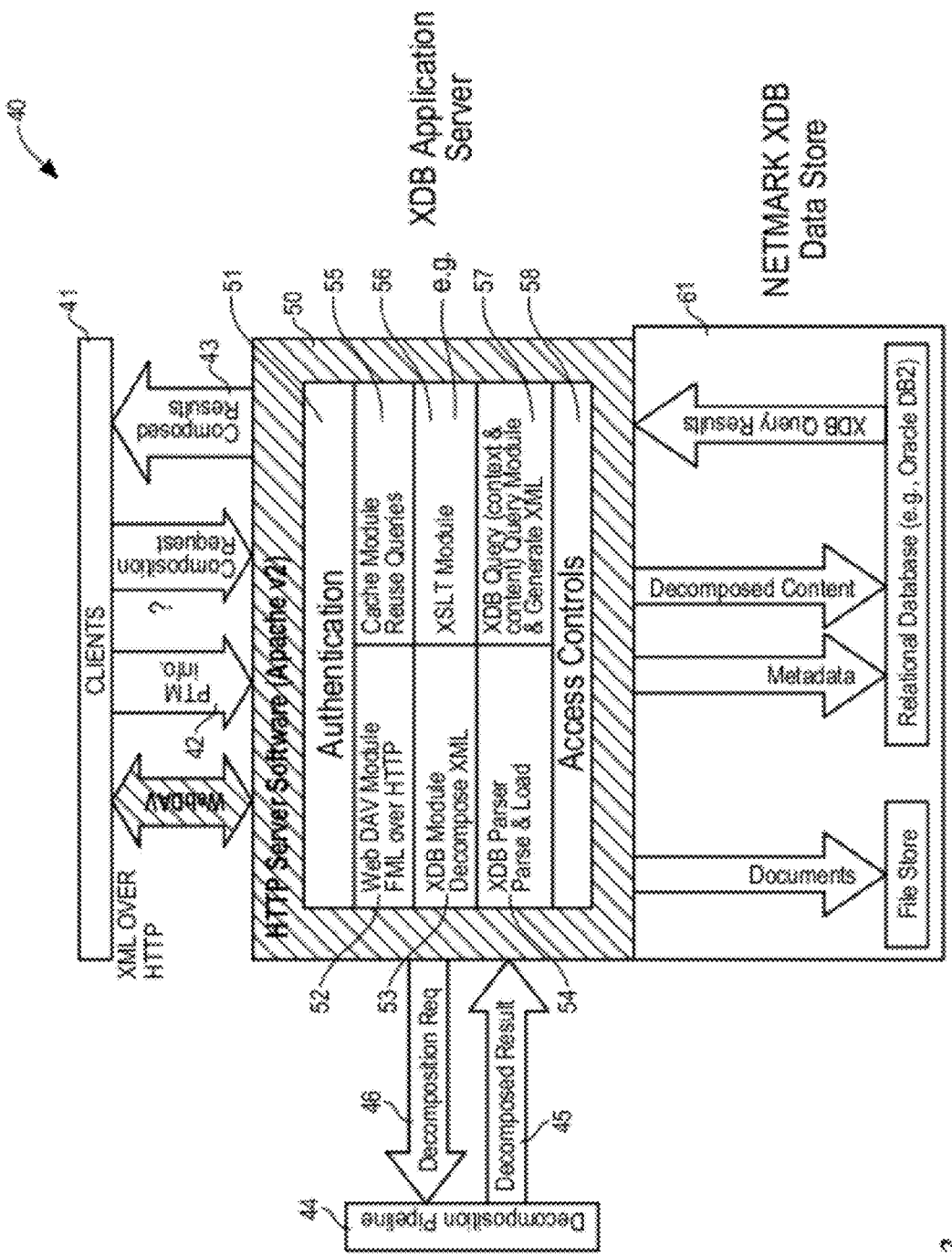

FIG. 3 provides another perspective on the architecture illustrated in FIG. 2. A client-information supplier ("client-supplier") 41 provides a PMT-formatted information statement 42 for direct use in the system 40, in a format or composition that is prescribed by the system. A client, including but not limited to a client-suppler, may request a project report or other result(s) from the system 40, by entering a PMT information request 43 in a prescribed format or composition. Optionally, a client, client-supplier or another information source 44 also provides supplemental information statements 45, not necessarily in a prescribed format or composition, that are decomposed and reformatted in a format that the system recognizes and with which the system can work. This reformatting of the supplemental information 45 may rely upon content searching and/or context searching, as described in another patent application, U.S. Ser. No. 10/232, 975.

An XDB application server 50 receives the PMT information 42 and the supplemental information 45 and directs this information to an appropriate processor(s) for further analysis and use. The XDB server 50 optionally includes an authentication module 51 that authenticates the information provider and/or the information requester, using a password, a biometric indicium, a subscriber list or another means to distinguish authenticated users from non-authenticated entities.

The XDB server 50 optionally includes a WebDAV (Web distributed authoring and versioning) module 52, an XDB module 53, an XDB parser 54, a cache module 55, an XSLT module 56, a query module 57 and an access control module 58. The WebDAV module 52 provides XML over HTTP communication between a client 41 and a system including an XDB database. The XDB module 53 decomposes a statement in XML. The XDB parser module 54 provides context searching and content searching of information, retrieved from an XDB data storage module 61 that receives and stores PMT-formatted or non-formatted information statements from an information supplier. The cache module 55 receives and temporarily stores information statements previously requested by another user and operates in a manner similar to operation of a computer cache. The system 40 is a multiple user system so that it is possible, even likely, that two or more users will request the same information in the same or a similar format. The XSLT module 56 translates information requests and information responses between a client-supplied format and a format understood and used by the system 40. For example, the XSLT module 56 translates between XML language on the server side and any of HTML, pdf, spread sheet and a Word document on the user side.

The query module 57 receives an information query in a user-supplied format and provides a restatement of the user's query in a format understood and used by the system. The access control module 58 controls access to the XDB data store module 61 by XDB server modules, such as the query module 57. This access may require provision of a password or other authentication mechanism and/or may require that the access be requested in a specified format.

The N.A.S.A. XDB-IPG (extensible database-information power grid platform) is a flexible, complete cross-platform module, a set of essential interfaces that enable a developer to construct an application and that inter-operate at the data level. The XDB-IPG provides uniform, industry standard, seamless connectivity and interoperability. The XDB-IPG allows insertion of information universally and allows retrieval of information universally. An XDB-IPG API provides a call level API for SQL-based database access.

The XDB-IPG uses existing relational database and object oriented database standards with physical addresses for efficient record retrieval. The XDB-IPG works with structured, semi-structured and unstructured documents. XDB-IPG defines and uses a schema-less, hybrid, object-relational open database framework that is highly scalable. The XDB-IPG generates arbitrary schema representations from unstructured and/or semi-structured heterogeneous data sources and provides for receiving, storing, searching and retrieval of this information.

XDB-IPG relies upon three standards from the World Wide Web Consortium Architecture Domain and the Internet Engineering Task Force: (1) hypertext transfer protocol (HTTP) for a request/response protocol standard; (2) extensible markup language (XML), which defines a syntax for exchange of logically structured information on the Web; and (3) a Web distributed authoring and versioning (WebDAV) system that defines http extensions for distributed management of Web resources, allowing selective and overlapping access, processing and editing of documents. XDB-IPG provides several capabilities for distributed management of heterogeneous information resources, including: storing and retrieving information about resources using properties; (2) locking and unlocking resources to provide serialized access; (3) retrieving and storing information provided in heterogeneous formats; (4) copying, moving and organizing resources using hierarchy and network functions; (5) automatic decomposition of information into query-able components in an XML database; (6) content searching plus context searching within the XML database; (7) sequencing workflows for information processing; (8) seamless access to information in diverse formats and structures; and (9) provision of a common protocol and computer interface.

In the hybrid object-relational model (referred to herein as ORDBMS), all database information is stored within relations (optionally expressed as tables), but some tabular attributes may have richer data structures than other attributes. As an intermediate, hybrid cooperative model, ORDBMS combines the flexibility, scalability and security of using relational systems with extensible object-oriented features (e.g., data abstraction, encapsulation inheritance and polymorphism. Six categories of data are recognized and processed accordingly: simple data, without queries and with queries; non-distributed complex data, without and with queries; and distributed complex data, without and with queries. Simple data include self-structured information that can be searched and ordered, but do not include word processing documents and other information that are not self-structured. XDB-IPG is concerned primarily with distributed complex data that can be queried. Preferably, XML is used to incorporate structure, where needed, within documents in XDB-IPG, as a semantic and structured markup language. A set of user-defined tags associated with the data elements describes a document's standard, structure and meaning, without further describing how the document should be formatted or describing any nesting relationships. XML serves as a meta language for handling loosely structured or semi-structured data and is more verbose than database tables or object definitions. The XML data can be transformed using simple extensible stylesheet language transformation (XSLT) specifications and can be validated against a set of grammar rules, logical Document Type definitions and/or XML schema.

Because XML is a document model, not a data model, the ability to map XML-encoded information into a true data model is needed. XDB-IPG provides for this need by employing a customizable data type definition structure, defined by dynamically parsing the hierarchical model structure of XML data, instead of any persistent schema representation. The XDB-IPG driver is less sensitive to syntax and guarantees an output (even a meaningless one) so that this driver is more effective on decomposition that are most commercial parsers.

The node type data format is based upon a simple variant of the Object Exchange Model (OEM), which is similar to the XML tags. The node data type contains a node identifier and a corresponding data type. A traditional object-relational mapping from XML to a relational database schema models the data within the XML documents, as a tree of objects that are specific to the data in the document. In this model, an element type with attributes, content or complex element types is generally modeled as object classes. An element type with parsed character data and attributes is modeled as a scalar type. This model is then mapped into the relational database, using traditional object-relational mapping techniques or as SQL object views. Classes are mapped to tables, scalar types are mapped to columns, and object-valued properties are mapped to key pairs. The object tree structure is different for each set of XML documents. However, the XDB-IPG SGML parser models the document itself, and its object tree structure is the same for all XML documents. The XDB-IPG parser is designed to be independent of any particular XML document schemas and is thus schema-less.

An XDB preferably uses a universal database record identifier (UDRI), which is a subset of the uniform resource locator (URL) and which provides an extensible mechanism for universally identifying database records. This specification of syntax and semantics is derived from concepts introduced by the World Wide Web global information initiative and is described in "Universal Recording Identifiers in WWW" (RFC1630).

Universal access (UA) provides several benefits: UA allows different types and formats of databases to be used in the same context, even when the mechanisms used to access these resources may differ; UA allows uniform semantic interpretation of common syntactic conventions across different types of record identifiers; and UA allows the identifiers to be reused in many different contexts, thus permitting new applications or protocols by leveraging on pre-existing and widely used record identifiers.

The UDRI syntax is designed with a global transcribability and adaptability to a URI standard. A UDRI is a sequence of characters or symbols from a very limited set, such as Latin alphabet letters, digits and special characters. A UDRI may be represented as a sequence of coded characters. The interpretation of a UDRI depends only upon the character set used. An absolute URI may be written <scheme><scheme-specific-part>.

The XDB delineates the scheme to IPG, and the scheme-specific-part delineates the ORDBMS static definitions.

Each periodic (e.g., monthly) progress report, task plan report and risk management report uses a sequence of XDB queries to identify and format XML data into tabular cells within a Microsoft Excel or similar spreadsheet. A Netmark XDB query is executed within a standard HTTP request/response protocol, as a URI or URL. A result of the query is returned as well-formed XML content which can be parsed, transformed and/or processed by an application for rendering and for presentation via XSLT or by Visual Basic macros. A Netmark XDB query allows use of single or multiple context-plus-content keyword search criteria, and allows display of performance status for an ECS Engineering Information Management project. In one approach, input commands such as &CONTEXT, &CONTENT, &SYNTAX, &SCOPE, &XPATH and $XSLT are used to specify type of search, display option(s), scope of objects to be searched, and details concerning server-side processing and user-side processing.

Figure 4A:
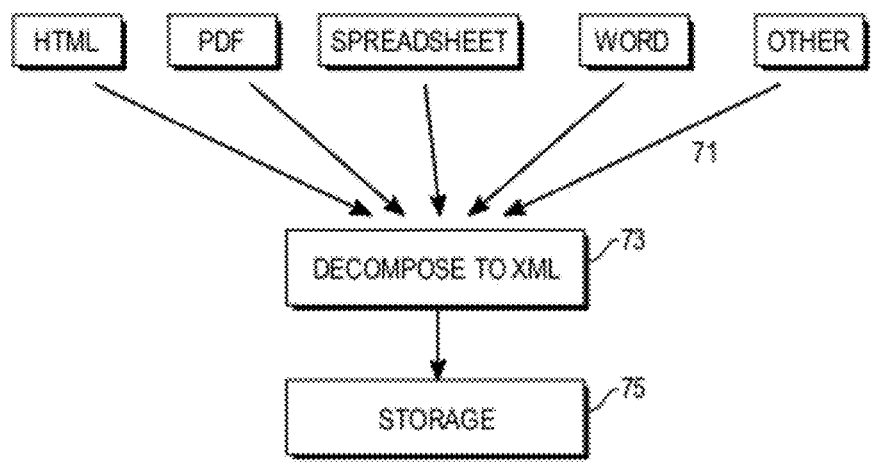
FIGS. 4A and 4B schematically illustrate flow of information into and out of the system.
Figure 4B:
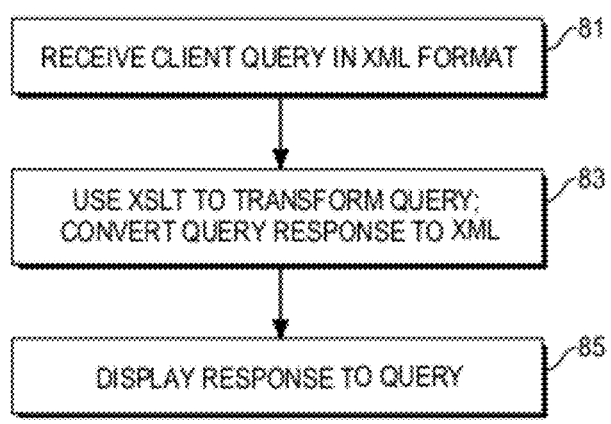

FIGS. 4A and 4B illustrate a flow of information into and out of the system according to an embodiment of the invention. In FIG. 4A, a user-supplier enters PMT-specific information in a HTML, PDF, spread sheet, Word document format, or other non-PMT-specific (supplemental) information, from a desktop in step 71. This information statement or information request is received and decomposed, for example, in an XML/HTML transformation, in step 73 and is stored in a server storage unit, in step 75, for subsequent query and/or analysis.

In FIG. 4B, the server system receives an information query in XML format from a user, in step 81. In step 83, the server system uses XSLT to transform the query request and to convert to an XML response sequence, representing a response to the query. In step 85, the converted sequence is displayed in a visually perceptible format for the user who submitted the query.

Figure 6:
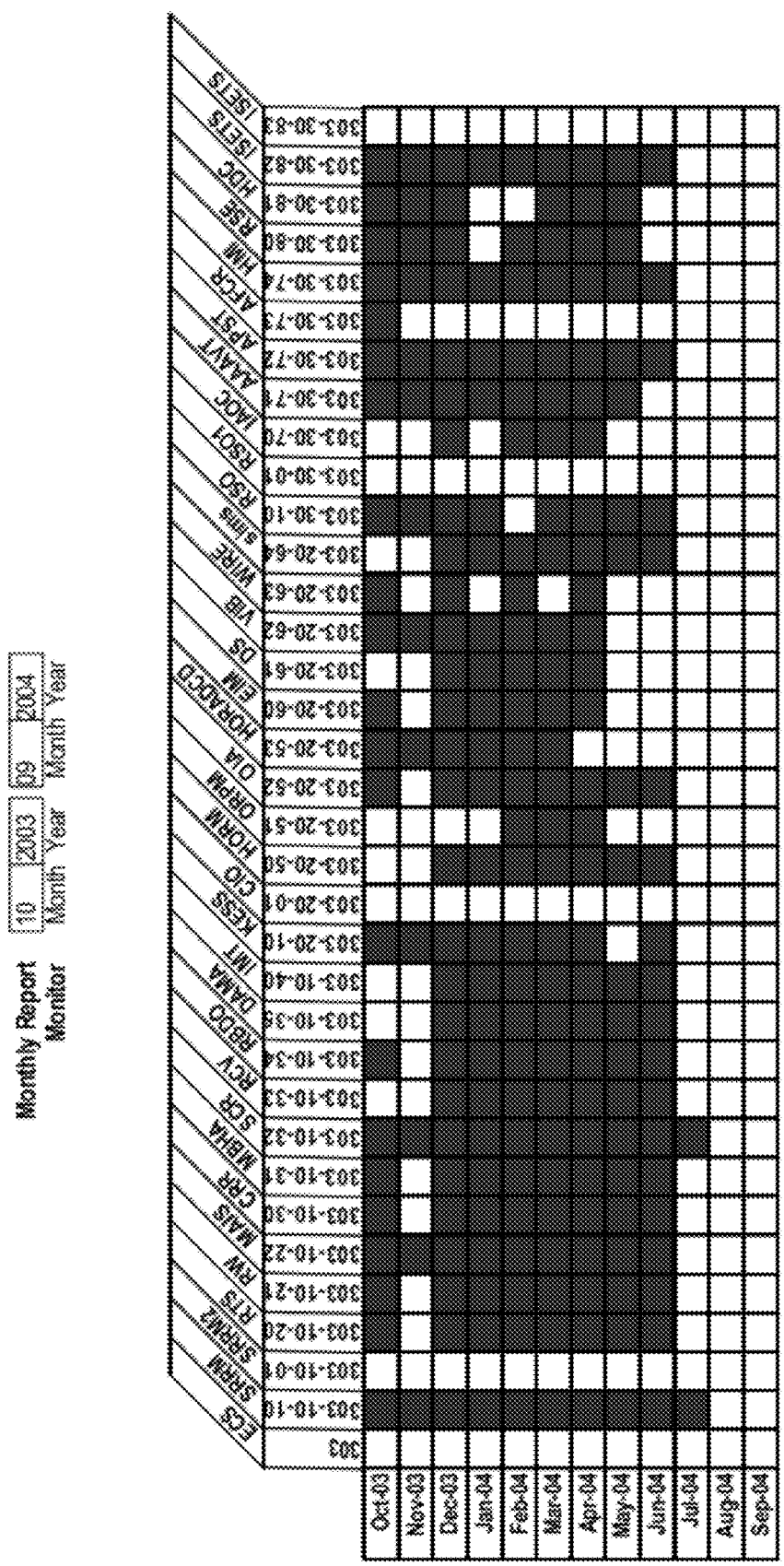
FIG. 6 indicates, in a spreadsheet format, which periodic reports have, or have not, been submitted at the present time.

FIG. 5 illustrates a screen that can be used to submit or to view periodic (e.g., monthly) reports that are regularly submitted in an embodiment of the invention, together with the name and affiliation of the person responsible for each such report. As each report is received, a "check-off" is performed for that period, and a blank space in a spreadsheet (illustrated in FIG. 6 for 3 calendar years of 12 months each) is replaced by another color or by a selected symbol. A user can quickly determine if a chosen report for a given period is available for viewing, using FIG. 6, and can return to FIG. 5 to call up an available report.

Figure 7:
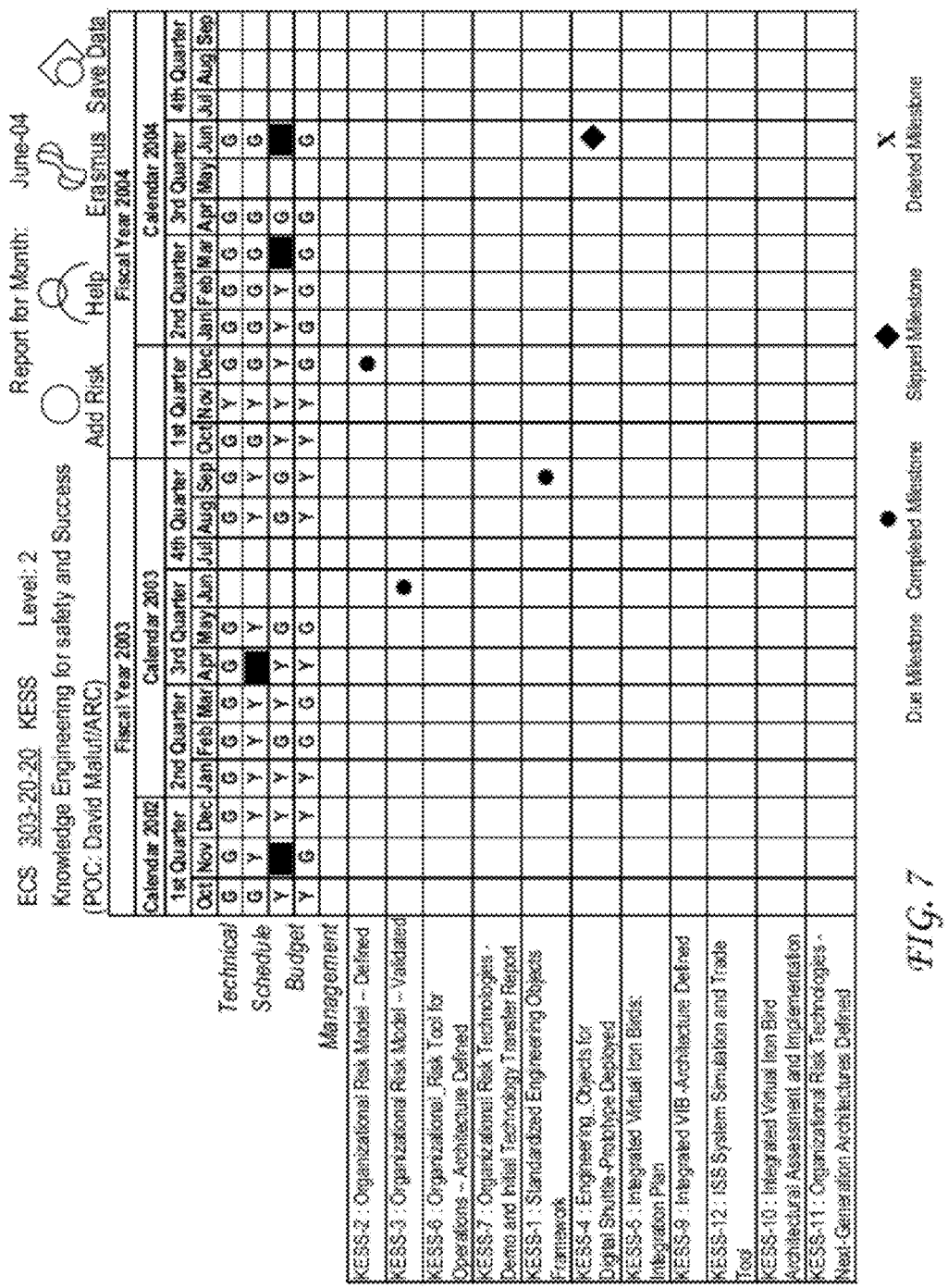
FIG. 7 indicates the status of formal milestones for each of several projects in the system.
Figure 9:
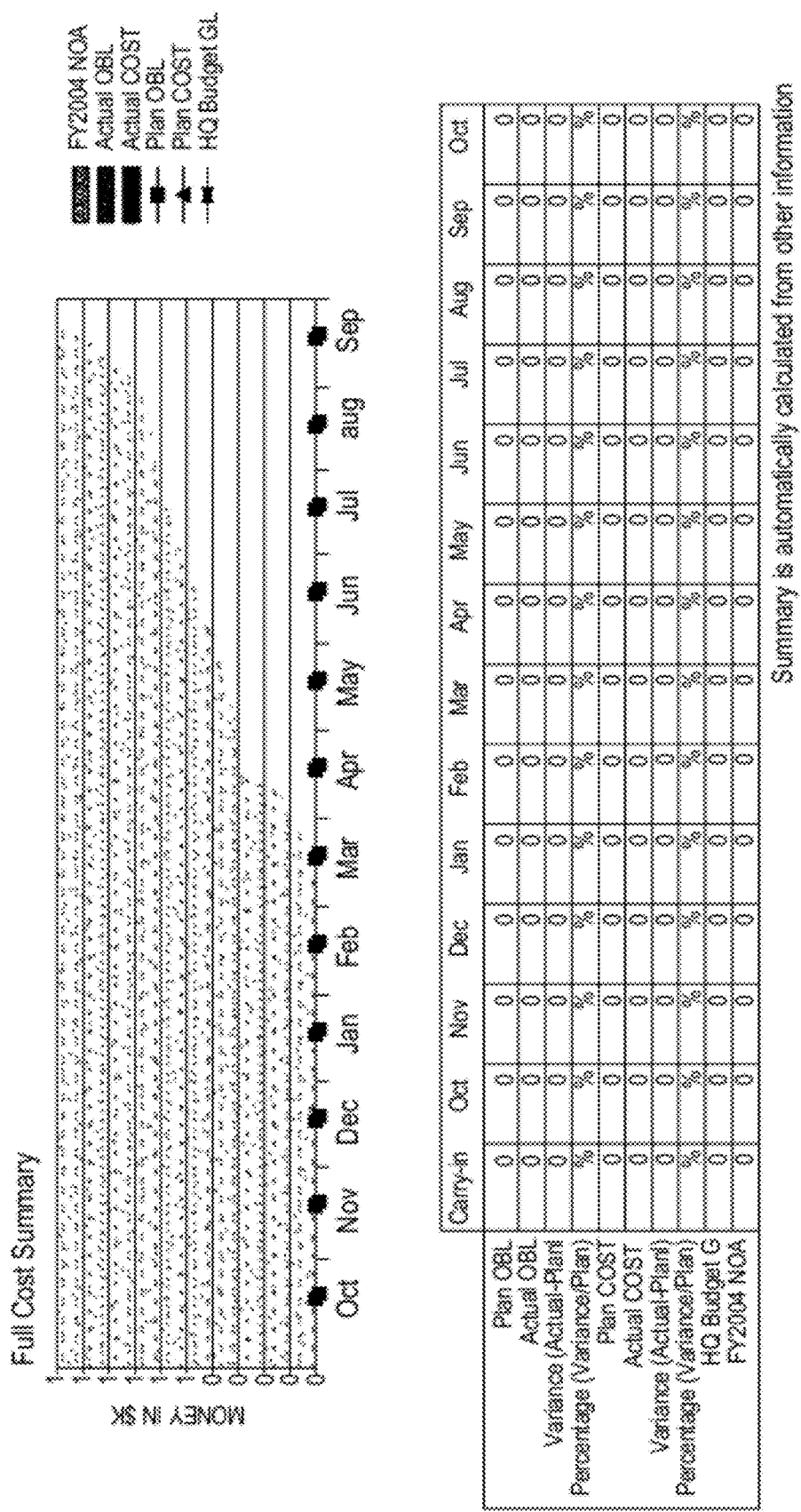
FIGS. 9-15 illustrate displays of resource allocations consumed for each period for a project.
Figure 10:
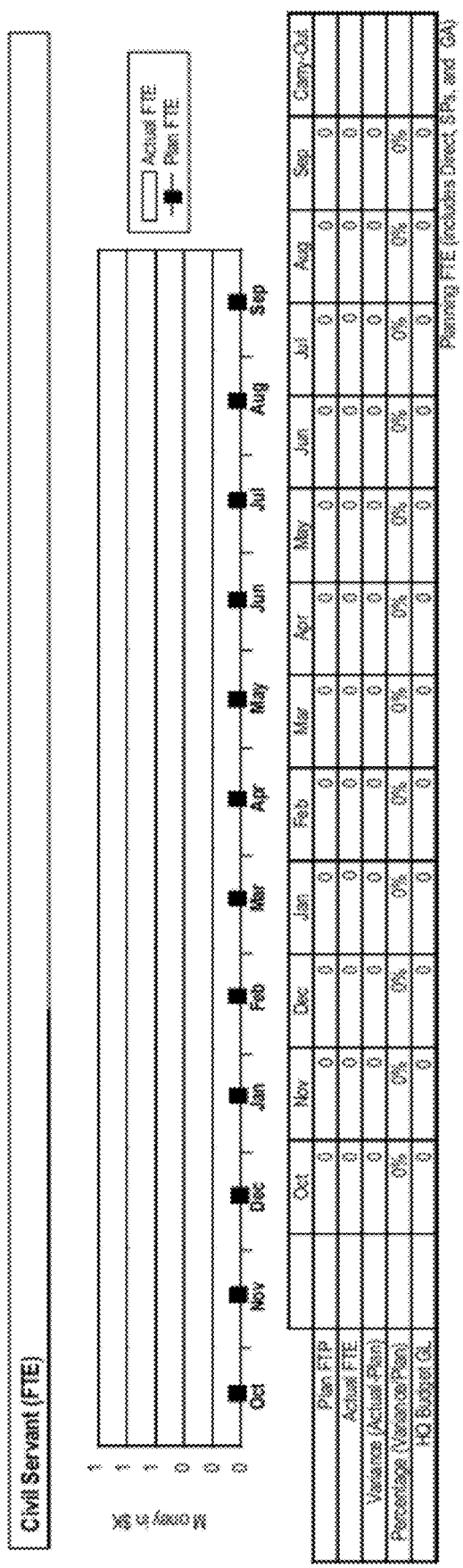
Figure 11:
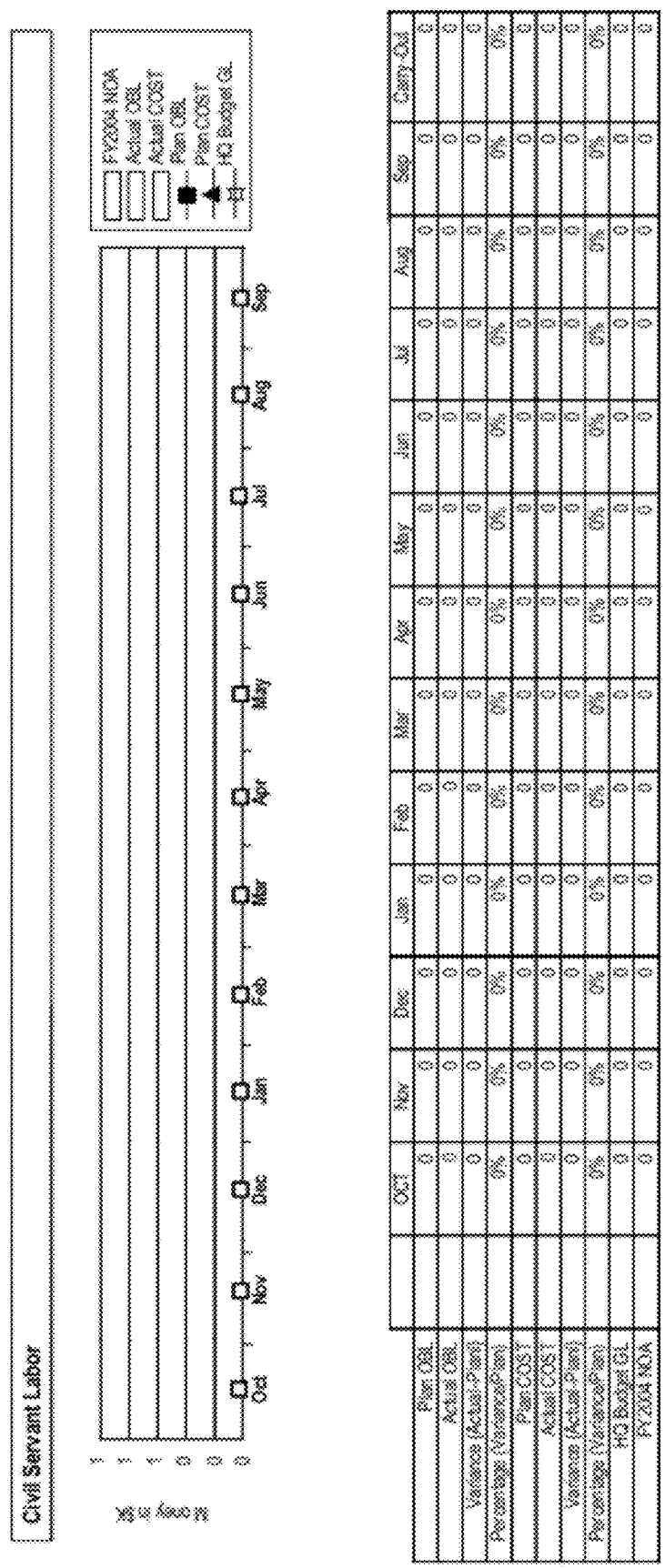
Figure 12:
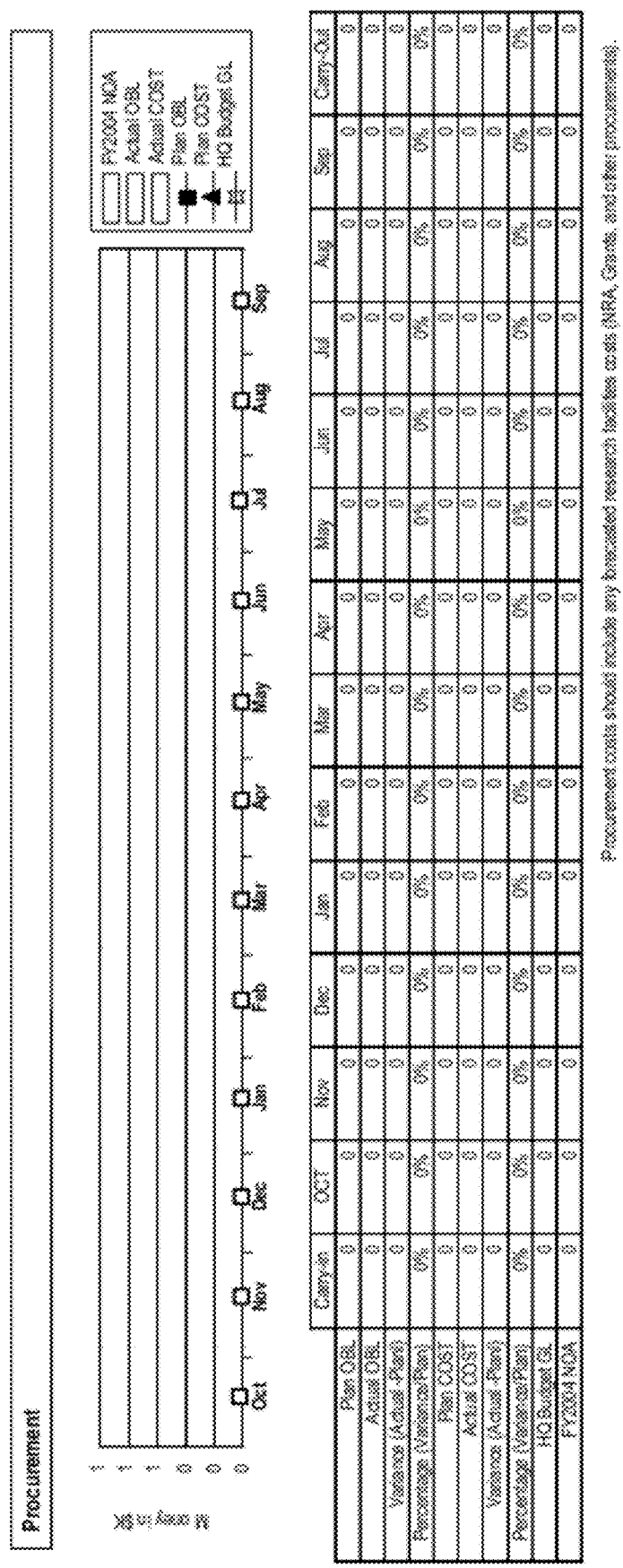
Figure 13:
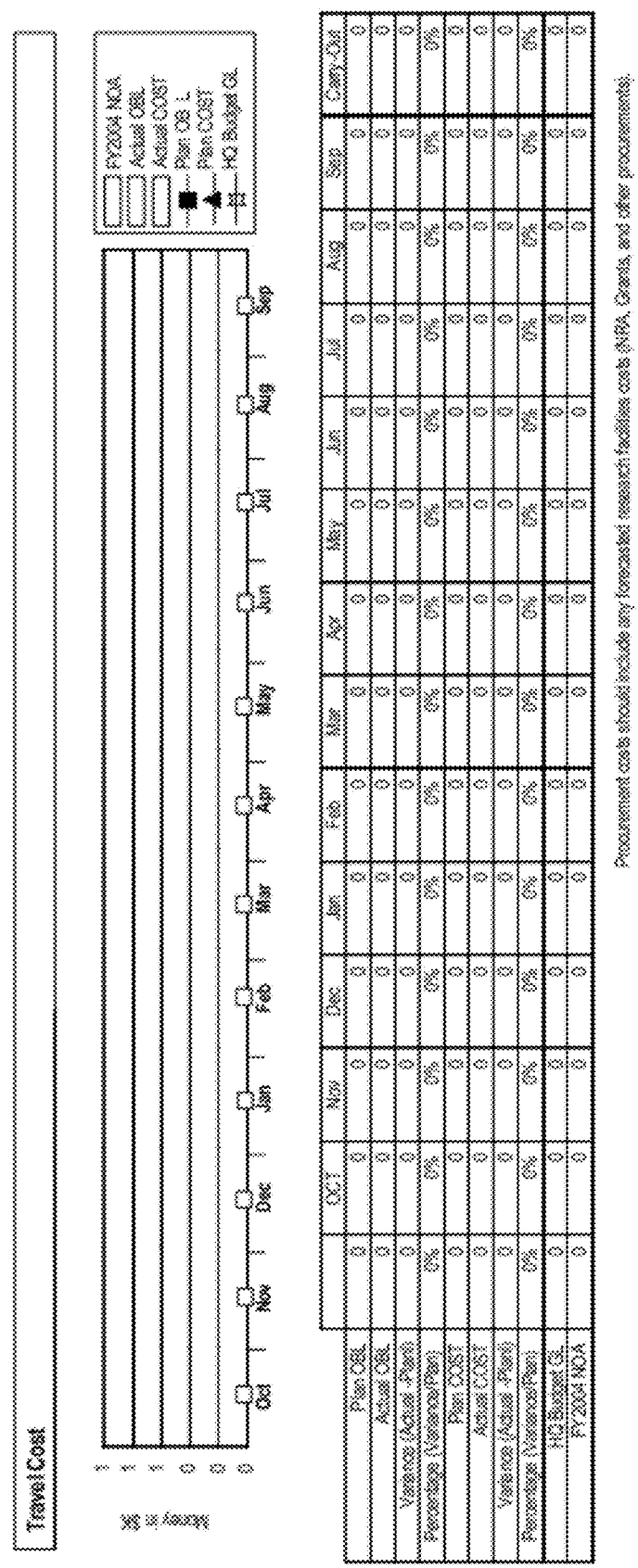
Figure 14:
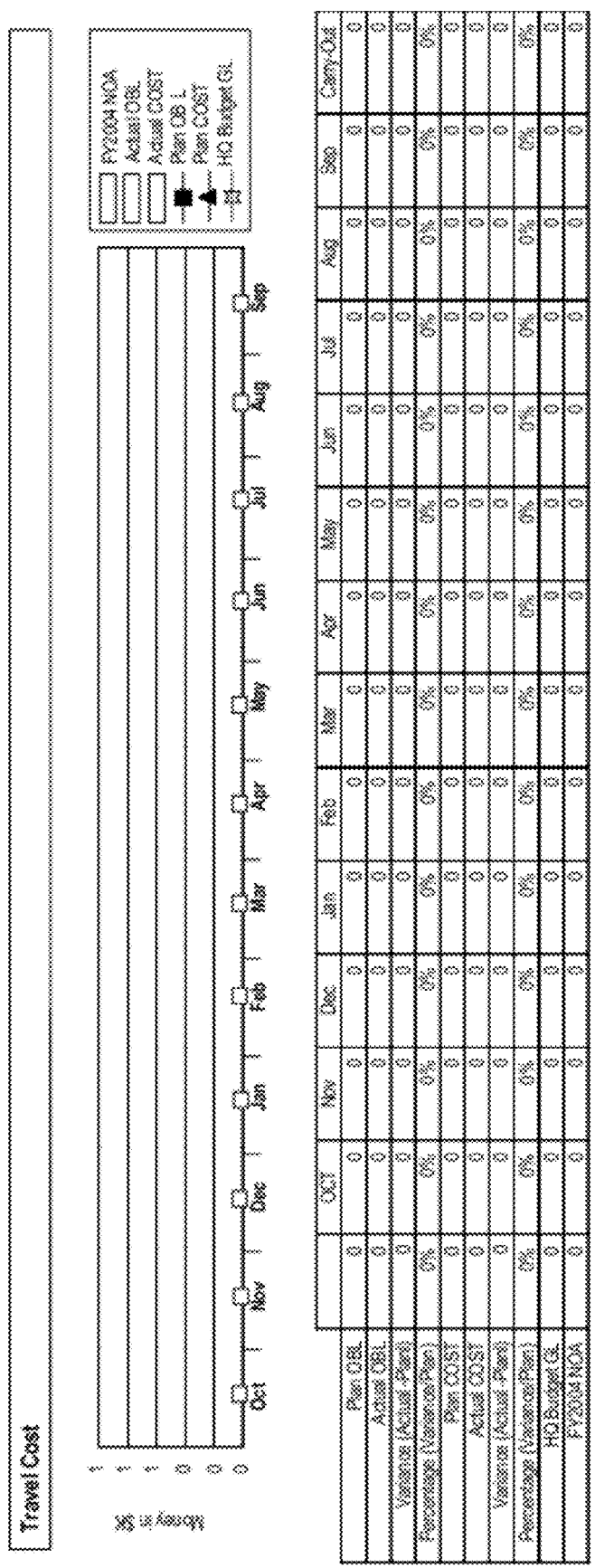
Figure 15:
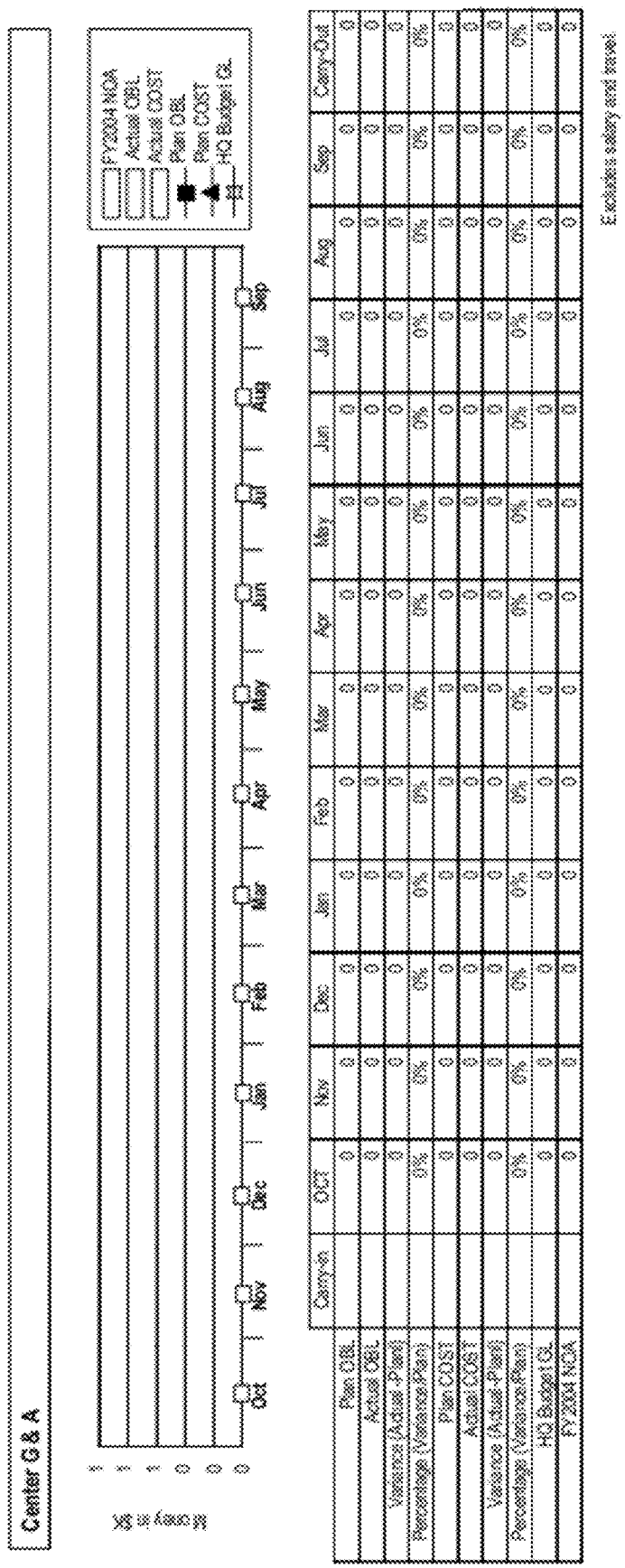

FIG. 7 illustrates a screen that displays milestones in each of four categories for eight consecutive quarters of two fiscal years and for each of eleven specified tasks: completed milestone, due but not yet completed, slipped milestone (time delay in completion), and deleted milestone. A project may have milestones associated with some tasks and not with others, as illustrated in FIG. 7. A milestone should be distinguished from a schedule for completion of one or more tasks, which is generally present for any task. Each of a group of tasks may have a risk (that a task will not be completed on time or within budget or meeting specified technical requirements) associated with each task, based on availability of technical personnel and/or equipment and/or test equipment and/or material and/or funding. In one approach, present status of a task is color coded green if the schedule is being met, yellow if the schedule has slipped or is slipping substantially, and red if the task is stalled.

FIG. 8 illustrates an interactive screen, showing a sequence of identified tasks at the left and allowing a call-up of information on technical status, schedule status, budget status and/or management status for the task, using the indicated buttons shown at the right.

FIGS. 9-15 display information, in graphic format and in tabular format, on full cost expenses, full time equivalent (FTE) civil servant allocation, civil servant labor, procurement expenses, travel cost, indirect services expenses, and general and administration (G&A) expenses for a task or a project for a specified time interval (here, 12 consecutive months). The display presents projected versus actual expenditures and deviations, projected cost versus actual cost to date and deviations, and the amount budgeted for each reporting period (here, monthly).

Figure 16:
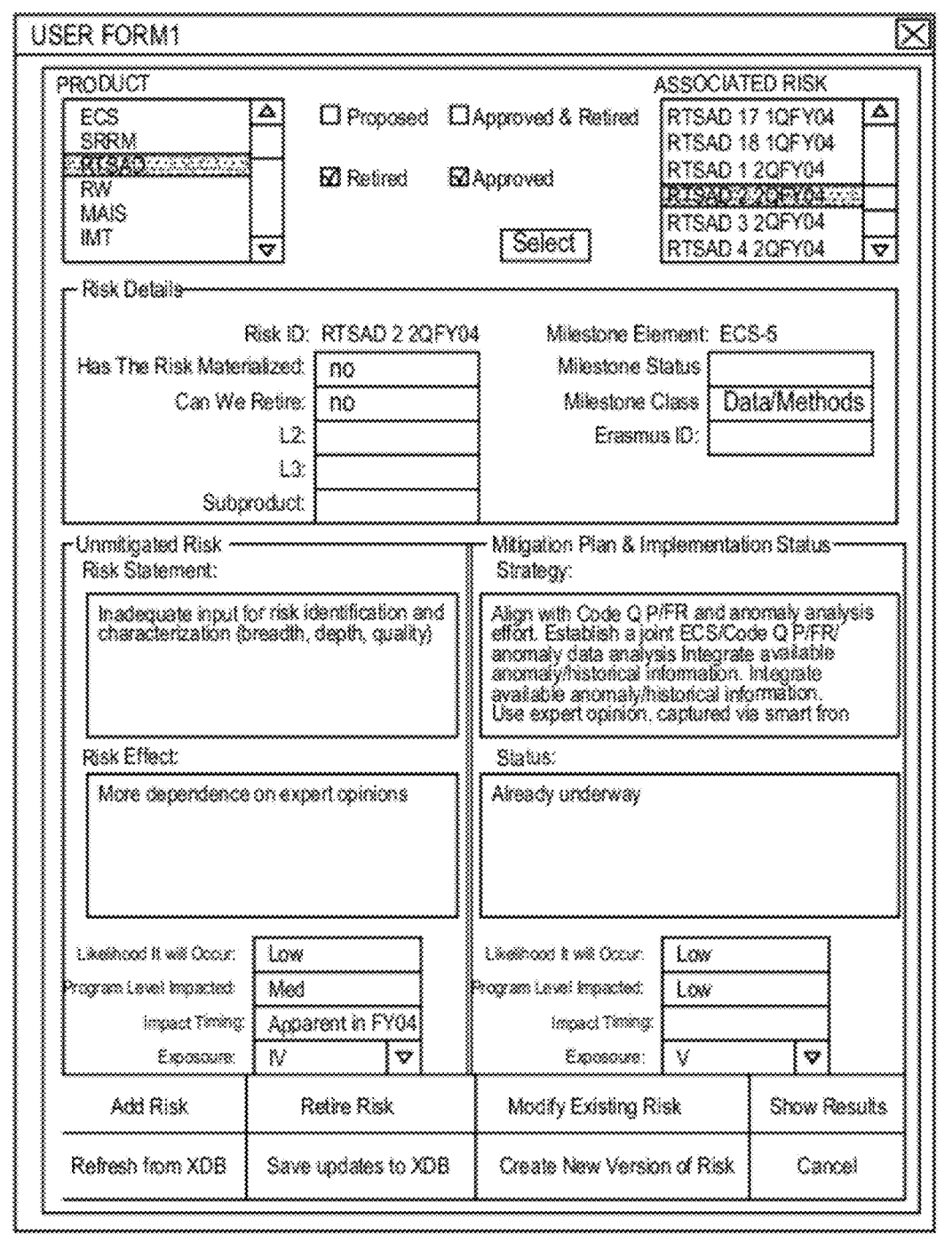

Risk is assigned in different categories: technical, schedule, budget, management, in-house work force skill mix, contractor work force skill mix, planned versus achieved goals, possibility that a project will not produce an acceptable product (e.g., knowledge, hardware, software, procedure, a time varying requirements schedule, etc.) that will add to a useful store of resources for this user. FIG. 16 illustrates an interactive screen for assessing specified risks associated with a task or project, optionally including determinations of: has the risk materialized; likelihood that a specified risk will occur; characterization(s) of non-mitigated risks; risk mitigation plan, if any; and relationship, if any, of a risk to a milestone.

FIG. 16A illustrates different categories of risks, and risk sources, associated with a project. Technical risk includes (but is not limited to): failure of the product under development to meet an intermediate test that must be passed before further development can be pursued; failure to deliver an acceptable product; delivery of an acceptable, but manifestly unreliable, product; delivery of an acceptable product at a time beyond the originally agreed delivery date; determination that the contemplated product cannot work as required (for reasons of physics, chemistry, electronics, etc.); and possible introduction by a competitor, before or after delivery of the contemplated product, of a competing and arguably superior product. Schedule risk includes: failure to meet one or more ab initio milestones; insertion of one or more additional time periods in the development cycle to allow investigation of an unexpected (usually detrimental) intermediate result; and unexpected change in the milestone schedule. Budget risk includes: failure to reach one or more ab initio schedule milestones within, or near to, the allocated budget increment; forced "borrowing" from a subsequent budget increment to respond to a present and unexpected problem; and unexpected change in one or more budget increments allocated to one or more stages of product development. Management risk includes: partial or complete unavailability of the required personnel to manage one or more stages of the development. In-house skill mix risk and contractor(s) skill mix risk each include: unavailability of critical skills (because of, general unavailability, retirement, departure, reassignment, illness among or other interfering activity) needed to meet one or more of the schedule milestones.

FIGS. 17A, 17B and 17C illustrate interactive screens for input of task plan information into the system, including identification of task leaders, funding information and statements of task objective(s), benefits from completion of task, motivation for performing the task, technical and human resource and budget challenges, innovative ideas proposed to address the challenges, and present state of the technical art, if relevant. These documents may be supplemented by identification of, and personal information on, the managers and operational workers and on the (potential) customers or users of the results of the project, illustrated in an interactive screen in FIG. 18.

FIG. 19 sets forth some metrics, or measures of performance, that can be used to evaluate the development of the project or tasks within the project. This includes an assessment of the current technology readiness level (TRL), target criteria for completion of the project and exit criteria for withdrawal from the project before completion.

FIGS. 20A and 20B set forth some representative technology areas that might be of concern for a given project and may include an assessment of the scope and depth of human resources available to cover these technologies. A project total cost is distributed or allocated across features and activities associated with the project.

FIG. 21 sets forth deliverables associated with completion of the project or tasks within the project.

FIGS. 22A and 22B illustrate management check lists for estimating time and dollars required to perform several groups of related tasks.

The invention allows a PMT administrator to establish permissions (read, write, edit text, delete text, etc.) for a user for each report or related group of reports, preferably after consultation with, and agreement by, the user. Where the user has permission to write, to edit, to delete and/or to otherwise modify the text of a report, the user has an option to create a modified report, optionally labeled as "(title)/mod. date/user id." and to store and make further edits to this modified version. Optionally, each edited version of the original report is stored and labeled as such in the user's own memory space; but the original version of the report is also stored and is not replaced by any edited version.

Optionally, a user may be required to present one, two or more independent biometric indicia to authenticate the user's asserted identity, including one or more of a user fingerprint, a user voiceprint, a retinal scan of the user, a scan of blood transport channels in a selected region of the user's body, a scan of visible features of a selected portion of the user's face, and a sample of user cursive handwriting.

Implementation of a separate-storage option would allow most or all users who have review-access to a document (read permission) to write, edit and otherwise modify the original version, by storing the modified version only in the user's own memory space. Optionally, each user-modified version is separately stored in the user's memory space, together with a date of most recent modification of this version, to allow historical reconstruction of the user's thought process where relevant. Optionally, only the user who provided the modified version is permitted to view and further modify this version.

Where a user who does not have at least review-access to a report explicitly requests that report, the system optionally informs this user of the lack of review-access and recommends that the user contact the system administrator (name, phone number, e-mail address).

FIG. 23 schematically illustrates user input and output according to the invention. In step 231, a user-supplier enters information, using drag and drop or another entry maneuver, into a Web folder. In step 232, read/write/edit/delete permissions and database access permissions are set by the system for this information and this user. The entered information is decomposed to XML, in step 233, and the formatted information is stored in a data base, in step 234. In step 235, a user enters an information query, using an IE toolbar, specifying context searching and/or content searching. In step 236 the system searches for, and identifies, the requested information. In step 237, the identified information is composed as an XML file, and is rendered into a user-perceptible format in step 238. The user can select among options to view the rendered information as XML, as text or as HTML, using XSLT.

Figure 24A:
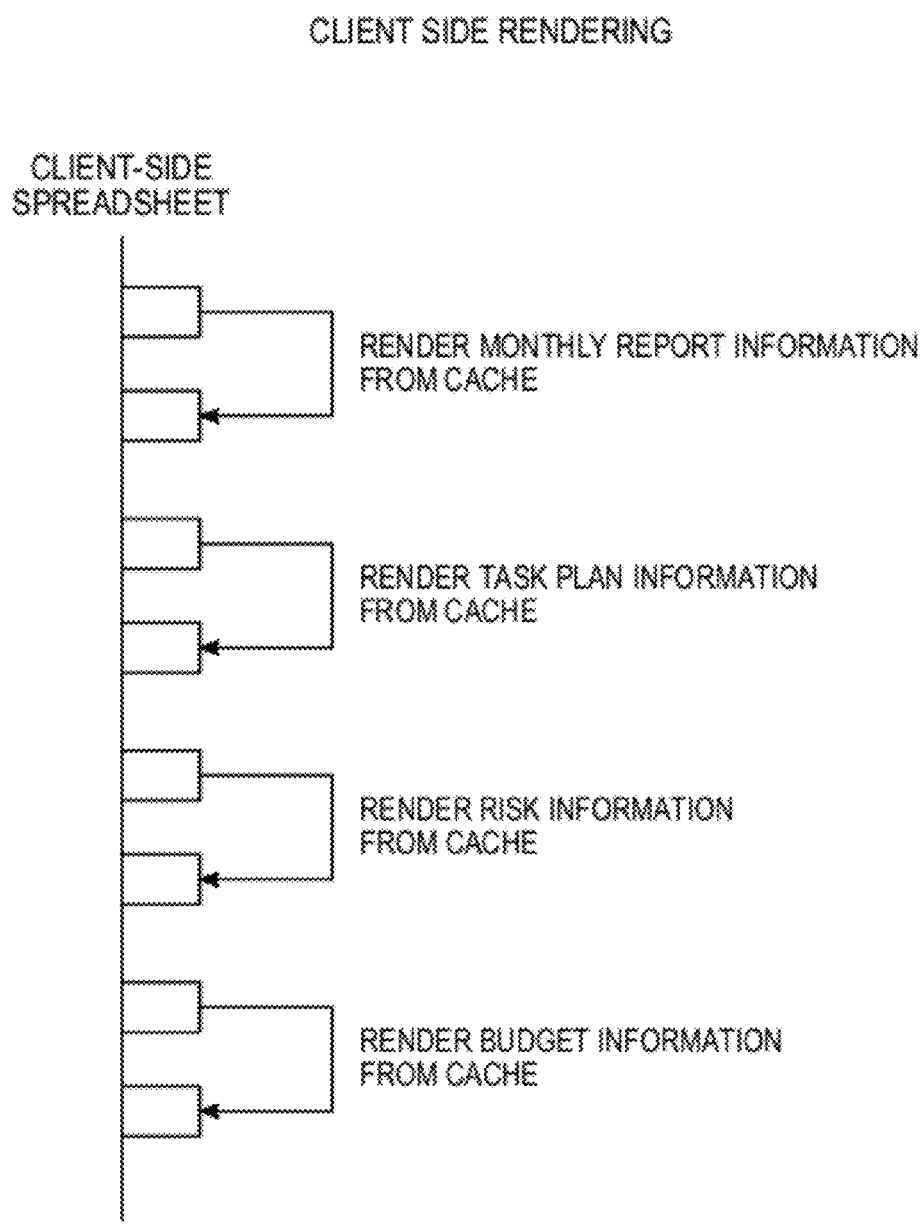
FIGS. 24A and 24B illustrate client side rendering of information, as requested by a user.
Figure 24B:
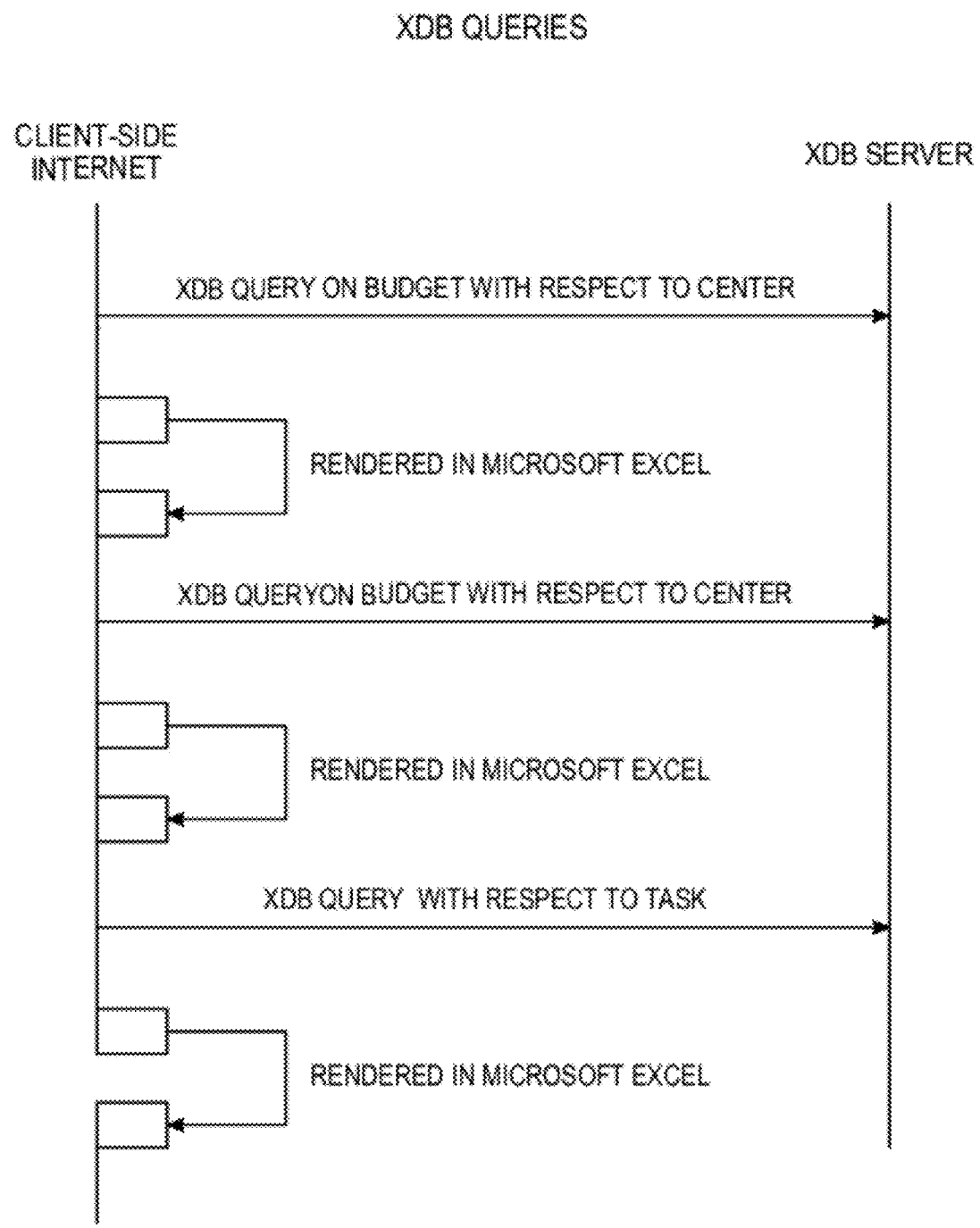

FIG. 24A is a high level view illustrating user side rendering of information, as requested by a user. Information from any of a Monthly Report, from a Task Plan, from a Risk Assessment, and from a Budget Presentation is identified and pulled together from a cache or other information source. FIG. 24B is a high level view illustrating entry of an XDB query for a Budget item, for a Monthly Report item and for a Task Plan item, according to a query format chosen by the user.

Figure 25:
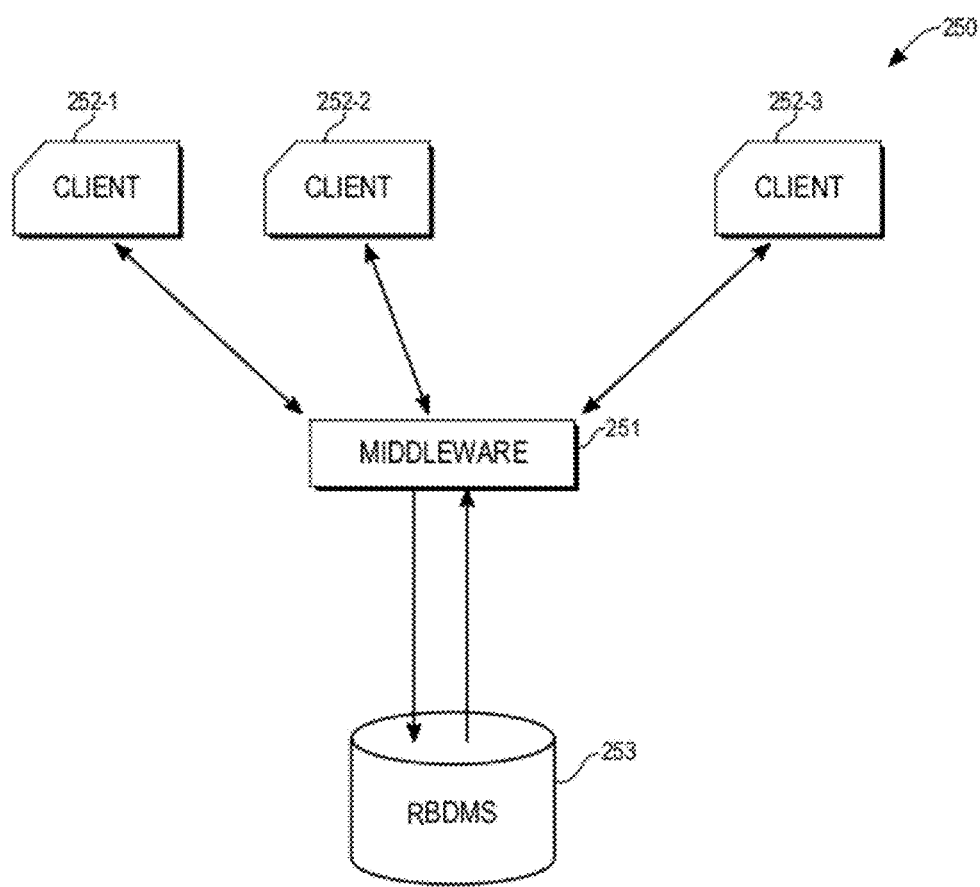
FIG. 25 schematically illustrates a conventional system for receiving, processing and analyzing project management data and for responding to queries concerning the received data.

FIG. 25 schematically illustrates a conventional system 250 for receiving, processing and analyzing project management data ("PM data") and for responding to queries concerning the received data. A middleware module 251 receives PM data from a plurality of clients 252-$i$ ($i=1, \ldots, I$), processes the PM data received, and stores the data in an RBDMS 253. The data stored in the RDBMS 263 is initially well structured, and whatever schema is initially adopted must be persistent, wherein certain parameters that define the schema do not vary with time. User information and queries are non-persistent. This limits the flexibility of the conventional system and requires imposition of certain constraints on the formatting of input information and of queries used with the system.

Figure 26:
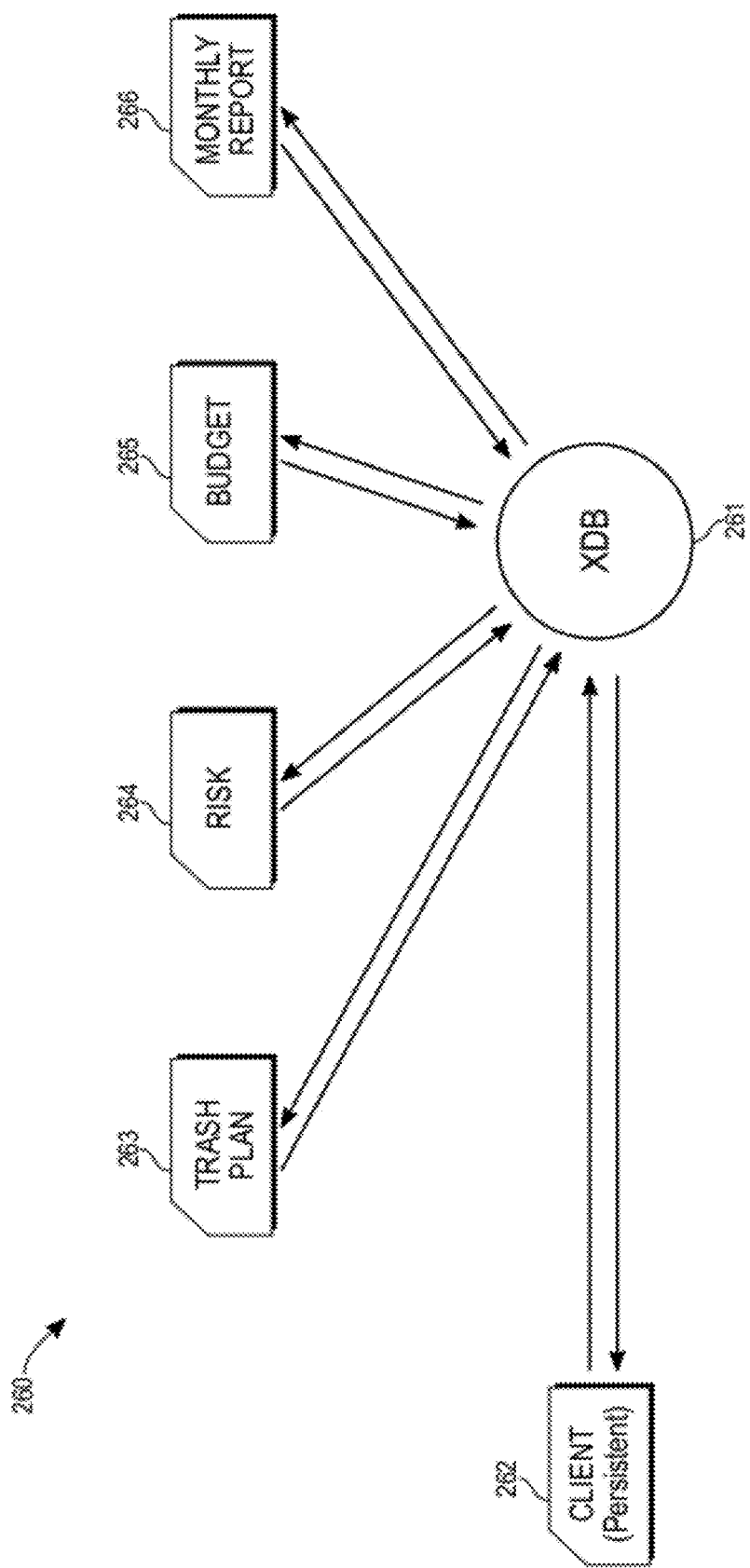
FIG. 26 schematically illustrates a system, constructed according to the invention, for receiving, processing and analyzing PM data, and for responding to queries concerning the received data, both unprocessed and processed.

FIG. 26 schematically illustrates a system 260, constructed according to the invention, for receiving, processing and analyzing PM data, and for responding to queries concerning the received data, both unprocessed and processed. The input information is received by an XDB database module 261 from a plurality of clients 262-$i$ ($i=1, \ldots, I$) that have non-persistent schema. At the XDB 261, the schema are set by the document decomposed into context/content, and are thus non-persistent: the context is defined during a post-processing phase, rather than during a pre-processing phase. The XDB module 261 uses an extension of Netmark, where context searching and content searching are provided, includes a cache for input information that is most frequently requested by system users, is heterogeneous, and works with arbitrary (time varying) schema. A user or client 262, normally having a persistent format, enters relevant data into the XDB module 262 or, alternatively, enters a query for information contained in the XDB module. The XDB module 261 enters the client-entered relevant information into a processing and storage module associated with one or more of a Task Plan component 263, a Risk Assessment component 264, a Budget component 265 and a Monthly Report component 266 or, alternatively, retrieves information from one or more of these components in order to respond to a user's query.

The invention permits configuring, and linking where feasible, a customized template of reports and accompanying illustrations for a particular user, and for adding or deleting other reports, based on the user present interests or needs. This allows a user to focus on the reports of immediate concern to the user and to avoid sorting through reports and related information that is not of concern to the user. For example, a particular user, primarily concerned with meeting a schedule, might de-emphasize or temporarily eliminate review of budget information and focus on time schedules and particular technical skills that are needed (but not yet available) to complete the project. As another example, a middle level manager, primarily concerned with a tightly defined sub-project, might focus only on reports with relevant information on that sub-project, rather than on omnibus reports on a broader project in which the sub-project is a component.

Figure 27:
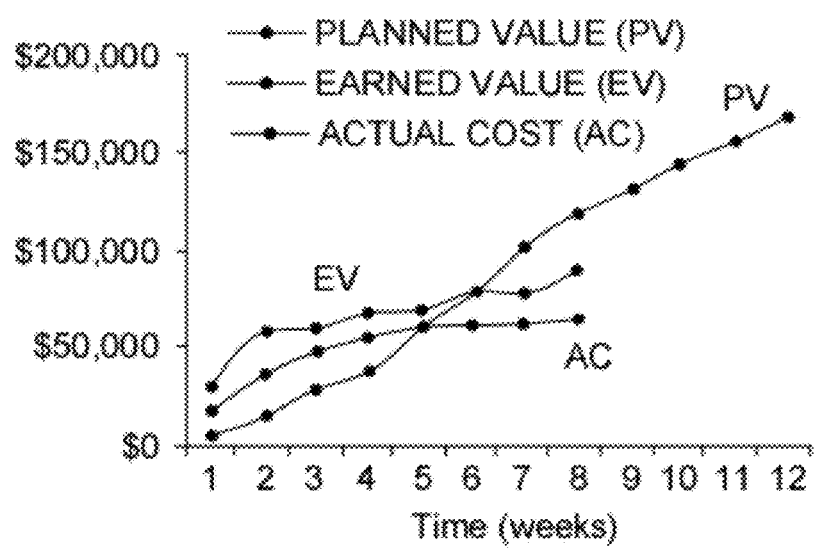
FIG. 27 graphically illustrates use of an Earned Value Management (EVM) formalism.

The PMT optionally provides an evaluation of a project using an Earned Value Management ("EVM") analysis of costs expended, and schedules met or unmet, using a formalism originally developed by the Department of Defense. In FIG. 27 illustrating use of EVM, each of several independent variables is measured at selected times, such as monthly or quarterly:

PV(t)=planned value of project=cumulative planned project cost to execute stages of the project from start date through time t;

AC(t)=cumulative actual costs expended on the project through time t

EV(t)=cumulative earned value to time t, based on percentage completion PCI(t);

PF(t)=portion of project fee earned, based on PCI(t);

PR(t)=portion of project reserve expended at time t;

CV(t)=cost variance at time t; CV(t)=EV(t)−AC(t);

SV(t)=schedule variance at time t; SV(t)=EV(t)−PV(t);

CPI(t)=cost performance index at time t; CPI(t)=EV(t)/AC(t);

SPI(t)=schedule performance index at time t; SPI(t)=EV(t)/PV(t).

The primary, independent, measured variables are PV(t), AC(t) and EV(t), with most other variables being determined from these three. Ideally, CV(t) and SV(t) are non-negative at any time value t and CPI(t) and SVI(t) are greater than or equal to 1. A project can be sub-divided into N sub-projects (N≧1), and corresponding variables (e.g., EV(t) for M sub-projects at the same time t) can be combined. OMB Circular A-11, incorporated herein by reference, sets forth some basic rules and guidelines for implementing EVM, which was originally developed for use by the Department of Defense.

In implementing an EVM formalism, a curve or time-based sequence of numbers $\{PV(t_m)\}$ for planned completion of project task(s) must first be chosen. The planned value variable PV(t) is often assumed to be piecewise linear, increasing approximately linearly throughout each measurement period (e.g., month-to-month). The variable AC(t) is measured in a straightforward manner. The variable EV(t) is a subjective quantity, which may be tied to an internal or external measure of completion, and is often the most difficult to assess.

Optionally, the system facilitates tool-to-tool (or database-to-database) queries by providing a lexicon of categories, groups within categories, and individual subjects within reports, with each such lexicon item having a link to a separate dictionary that briefly describes one or more reports corresponding to that link and optionally indicating the relationship of these reports to each other. This permits cross checking, where two or more different analysis tools are used in parallel to characterize operations and/or to provide consistency.

Where a user has use access to the subject invention (PMT) for a particular project and has use access to another, similar tool from another vendor for the same project, the user can query the PMT lexicon from the other tool and obtain review-access of corresponding information, for purposes of comparative analyses. The similar tool from the other vendor would need to be (re)formatted, using a tool-to-tool interface, (1) to present authentication and authorization for review-access to PMT, (2) to query the PMT lexicon, and (3) to call up and interactively display the corresponding PMT report(s). However, the subject invention provides a lexicon and the linking capability for a user to query PMT from a perspective of another tool.

This version of the invention, which is referred to herein as "PMT2" for convenience, contains many additional features that were not contained in a preceding version of the invention, referred to herein as "PMT1" for convenience. Although this is not required, it is preferable that PMT2 be backward compatible with PMT1 so that data and/or results produced using this earlier version (PMT1) of the invention can be imported into the present version (PMT2) and these imported data and/or results can be used as a modified starting point from which some or all of the new features available in PMT2 can be applied to this imported information.

The system also provides a lexicon for software labels so that different labels used by two (or more) different users to refer to the same corresponding illustration or text section can be identified and queried or otherwise used, where necessary, together with an identification of the user(s) who has adopted this different label. Where a first user has "split" a first label into sub-labels 1A and 1B, and this label corresponds to a second label, split into sub-labels 2A, 2B and 2C, employed by a second user, a request by the first user, for information on labels corresponding to sub-label 1A (or 1B), will call up the labels 2A, 2B and 2C and, optionally, will indicate characteristics of data with the particular labels 2A, 2B and 2C. This correspondence of labels can be applied analogously to the tool-to-tool correspondence, between users at the same entity or facility or between users at different entities or facilities.

One or more test cases is provided for a user in one or more categories of utilization, where a test case can be run before launching the application, or in mid-stream, to check on proper functioning of the PMT during its use phase. Choice of a test case in a particular category causes the system to test and interactively report to the user any anomalous results of computations, comparisons or image presentations that occur as the test case is being run. The test case results are reported on screen and/or in hard copy format. Optionally, only the anomalous results, rather than all results, are reported using an exception reporting approach. Data and procedures for a test case in a selected category are downloaded from a server. Test cases cannot be modified, except by a PMT administrator, and any such modification must be documented and stored in a secure place for future reference.

When a test case is run and one or more errors are identified in the execution or presentation of results, the error(s) is characterized or assigned to one or more in a list of categories, and its probable source(s) and date of occurrence are noted in an error log, which is preserved for historical purposes and cannot be deleted or modified. When the error is examined further and the appropriate software is modified to address the error, the software "fix" is also noted and preserved (read only) in the error log. When a software maintenance worker reviews the error log, closely related errors and their "fixes" can be identified to point up what may be a deeper underlying problem. Access to the error log may be restricted to authorized software maintenance personnel, or the character of particular errors may be selectively shared with one or more users. The system provides a lexicon of error categories, with each observed error being assigned to at least one category. A user can propose addition of a new category, if the particular error is not adequately accounted for in one of the existing categories.

Where an error occurs, the system optionally inquires if the user wishes to transmit to the system a dated error notification message, including the system's own characterization of the error and (optionally) the user's own succinct characterization of the error, for conflict identification and for historical purposes.

Optionally, the system automatically prepares, stores and temporarily displays an omnibus error report at specified time intervals (e.g., every seven days or once per month). The error report displays the errors chronologically and also displays the errors by category A test case for the PMT may include one or more selections from a set of test situations:

(1) Use of special characters and/or symbols that may cause the XML file to malfunction;

(2) Automated confirmation of fidelity and consistency of input data and of the results of computations within a spreadsheet or within a plurality of related spreadsheets;

(3) Check for presence of one or more broken or nonfunctional links on an instance Web page;

(4) Check for uniqueness of the associated WBS number;

(5) Confirmation that no special characters are present in the WBS number;

(6) Automated confirmation that all charts and graphs match the input data accurately;

(7) Automated confirmation that each dialog button works as required;

(8) Automated confirmation that large input data sets and large output data sets are handled efficiently and accurately;

(9) Automated confirmation that data uploading and data downloading work without malfunctioning and that corresponding data match.

Optionally, a spreadsheet has an associated expiration date, determined with reference to at least one of (i) the date of initial preparation of this spreadsheet (for the present period) and (ii) the date of most recent modification of this spreadsheet by this user or by any user and (iii) the date of most recent call-up and display without modification. Optionally, this expiration date can be modified (extended or accelerated) only by a system administrator.

Where one or more large data sets, or components thereof, is processed by the PMT, a tool bar is optionally provided for the user that links specified components and/or specified data sets that are related to each other. For example, pressing the tool bar when a given file is displayed can provide a menu of at least one other file that is linked or related to the displayed file. Spreadsheets, based upon Excel or another format and having up to $2^N$ cells (N≦16 or 24 or 32 or 48 or 64), are incorporated in the analysis and display operations. Optionally, these spreadsheets are prepared and displayed with two or more levels or selective granularity, as discussed in the preceding.

Data for a particular application of PMT may be obtained from the Internet and/or may be provided directly by the user. Optional security procedures allow the data used, and the results of processing by the PMT, to be confidentially maintained through imposition of user permissions (read, write, edit, analyze, display, etc.) and through storage in a secure place. The purpose of this security is to provide authentication that the version retrieved from the secure place is the correct one, not to provide secrecy for the contents.

Figure 28A:
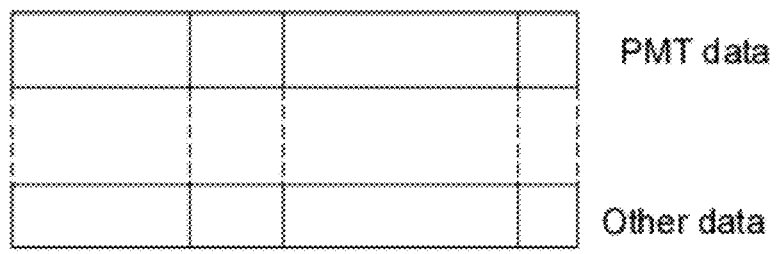
FIGS. 28A and 28B illustrate and compare ideal and realistic match-ups of corresponding data sections for PMT and another, unspecified processor.
Figure 28B:
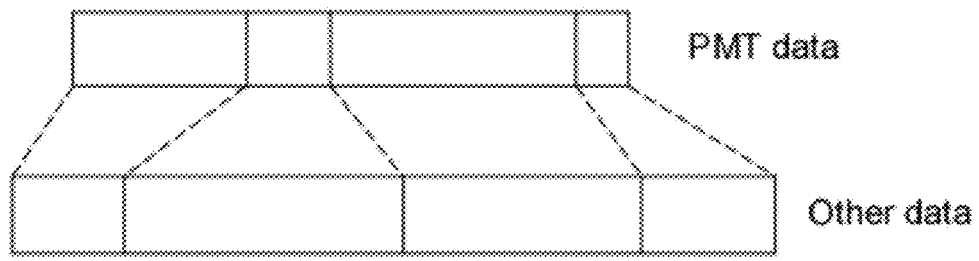

The PMT may be used as a flexible front end processor, by gathering and reformulating data processed and stored by a larger computer system that may be less flexible in data call-up, display and further processing than is the PMT. FIGS. 28A and 28B illustrate and compare data formats between PMT and another representative data processing and analysis system (referred to for convenience as "OTHER"), for an ideal match-up of corresponding sections (30A) and a more realistic match-up of corresponding sections (30B). In the realistic match-up of sections, Sections 1' (PMT), 2' (PMT), 3' (PMT) and 4' (PMT) are, respectively, larger than, smaller than, the same size as, and smaller than the corresponding sections 1' (OTHER), 2'(OTHER), 3'(OTHER) and 4'(OTHER), as indicated symbolically in FIG. 28B. After appropriate reconfiguration, the PMT compensates for the differences in section sizes and levels of detail, including providing an indication where the PMT data do not fully correspond to or cover the data requested by the OTHER processor.

What is claimed is:

1. A system for managing a project that includes a plurality of tasks and a plurality of workers, the system comprising providing a computer that is programmed:

to provide a searchable database and associated system that provides and visually displays information comprising:

a monthly report that reports, at each of at least two times including the present time, present status of each of a plurality of specified tasks and compares the present status of each specified task with an initial estimate of status of the corresponding specified task at the present time;

a task plan report that provides more detail on, and allows quantitative analysis on, at least one of the specified tasks;

a schedule report that provides at least one of a graphical presentation and an alphanumerical presentation of information comparing an schedule of completion of the at least one specified task with a present stage of completion of the at least one specified task;

a budget report that provides at least one of a graphical presentation and an alphanumerical presentation of information on at least one of: full cost summary to date of at least one of the specified tasks; worker full time equivalent to date for each worker associated with the at least one specified task; labor costs expended to date for each worker associated with the at least one specified task; travel costs expended to date for each worker associated with the at least one specified task; and overhead allocated to date for each worker associated with the at least one specified task;

a risk management report indicating at least one risk that has been accepted to date to complete the at least one specified task, indicating at least one risk mitigation measure that is proposed or implemented to mitigate the at least one risk, and providing an estimate of present risk that the at least one specified task will not be completed as initially estimated, where the at least one risk is drawn from a set of risks comprising a technical risk concerning performance of at least one product developed as part of the project, a schedule risk that a component of the project will not be completed and delivered according to an anticipated schedule, a budget risk that a component of the project will not be completed and delivered within an accepted budget, a management risk that one or more accepted milestones will not be met; an in-house worker skills mix risk that in-house personnel with one or more critical skills will not be available to work on the project; a contractor skills mix risk that contractor personnel with one or more critical skills will not be available to work on the project; an objectives risk that one or more milestones or goals will not be met within an acceptable time frame;

a skills availability risk report that evaluates a risk of unavailability of at least one critical development skill, needed to meet least one milestone of a project, because of at least one of retirement, departure, reassignment, illness, and other interfering activity for at least one of an in-house worker and a contractor worker; and a skills evaluation report that considers at least one of the following attributes: at least one skill or related group of skills asserted to be possessed by the at least one in-house worker; at least one skill or related group of skills asserted to be possessed by the at least one contractor worker; depth of the at least one in-house worker's skill, as measured by number of years working experience applying the skill or related group of skills; depth of the at least one contractor worker's skill, as measured by number of years working experience applying the skill or related group of skills; contributions to the at least one in-house worker's skill through training, education, apprenticeship and self-learning; contributions to the at least one contractor worker's skill through training, education, apprenticeship and self-learning; skills reinforcement and skills update training, and dates of the reinforcement and update training, received by the at least one in-house worker; skills reinforcement and skills update training, and dates of the reinforcement and update training, received by the at least one contractor worker; at least one example of projects in which the at least one in-house worker has applied this skill in preceding projects; and at least one example of projects in which the at least one contractor worker has applied this skill in preceding projects.

2. The system of claim 1, wherein said computer is programmed to evaluate at least one of the following risks as a technical risk: failure of product to meet intermediate or final test during development; failure to deliver an acceptable product; delivery of an acceptable, but manifestly unreliable, product; delivery of an acceptable product after agreed delivery date;
    determination that contemplated product cannot work as required; and possible introduction by a competitor of a competing/superior product.

3. The system of claim 1, wherein said computer is programmed to evaluate at least one of the following risks as a schedule risk: failure to meet at least one ab initio milestone; insertion of additional time period to allow investigation of, or response to, unexpected intermediate result; and unexpected change in milestone schedule.

4. The system of claim 1, wherein said computer is programmed to evaluate at least one of the following risks as a budget risk: failure to reach at least one ab initio budget milestone within, or near to, an allocated budget increment; forced "borrowing" from a subsequent budget increment to respond to an unexpected problem; and unexpected change in at least one budget increment allocated to one or more stages of project completion.

5. The system of claim 1, wherein said computer is programmed to evaluate at least one of the following risks as a management risk: partial or complete unavailability of the required personnel to manage one or more stages of product development within an acceptable time frame.

6. The system of claim 1, wherein said computer is further programmed to permit a system user to select a custom template of one or more of said monthly report, said task plan report, said schedule report, said budget report and said risk management report, presenting information of particular interest to the user.

7. The system of claim 6, wherein said computer is further programmed to permit said user to specify at least one of said monthly report, said task plan report, said schedule report, said budget report and said risk management report that is to be added to, or deleted from, said custom template to be presented to said user.

8. A system for managing a project that includes a plurality of tasks and a plurality of workers, the system comprising providing a computer that is programmed:
    to provide a searchable database and associated system that provides and visually displays information comprising:
    a monthly report that reports, at each of at least two times including the present time, present status of each of a plurality of specified tasks and compares the present status of each specified task with an initial estimate of status of the corresponding specified task at the present time;
    a task plan report that provides more detail on, and allows quantitative analysis on, at least one of the specified tasks;
    a schedule report that provides at least one of a graphical presentation and an alphanumerical presentation of information comparing an schedule of completion of the at least one specified task with a present stage of completion of the at least one specified task;
    a budget report that provides at least one of a graphical presentation and an alphanumerical presentation of information on at least one of: full cost summary to date of at least one of the specified tasks; worker full time equivalent to date for each worker associated with the at least one specified task; labor costs expended to date for each worker associated with the at least one specified task; travel costs expended to date for each worker associated with the at least one specified task; and overhead allocated to date for each worker associated with the at least one specified task;
    a risk management report indicating at least one risk that has been accepted to date to complete the at least one specified task, indicating at least one risk mitigation measure that is proposed or implemented to mitigate the at least one risk, and providing an estimate of present risk that the at least one specified task will not be completed as initially estimated, where the at least one risk is drawn from a set of risks comprising a technical risk concerning performance of at least one product developed as part of the project, a schedule risk that a component of the project will not be completed and delivered according to an anticipated schedule, a budget risk that a component of the project will not be completed and delivered within an accepted budget, a management risk that one or more accepted milestones will not be met; an in-house worker skills mix risk that in-house personnel with one or more critical skills will not be available to work on the project; a contractor skills mix risk that contractor personnel with one or more critical skills will not be available to work on the project; an objectives risk that one or more milestones or goals will not be met within an acceptable time frame;
    a comparative analysis report comparing the present period with at least one of N1 preceding periods (N1≧1), with reference to at least one of the technical risk, the schedule risk, the budget risk, the management risk, the in-house worker skills mix risk and the contractor worker skills mix risk,
    wherein the computer is further programmed:
    to store a version of at least one of the monthly report, the task plan report, the schedule report, the budget report and the risk management report for the present reporting period and for each of the N1 preceding periods;
    to provide a subject list of subjects that are covered in the present reporting period version of the stored report;
    to receive, from a user, a specification of at least one period, drawn from the present period and the N1 preceding periods, and a specification of at least one subject from the subject list, and to provide, for user read-only access, at least one relevant portion of the report from the at least one specified period; and
    to permit the user to indicate and to electronically copy at least one user-selected portion of at least one report, from the stored versions of the at least one report, for at least one of the present period and the N1 preceding periods.

9. The system of claim 8, wherein said computer is further programmed, as part of said monthly report for at least one month:
    to provide estimates of a planned value (PV) parameter that reflects cumulative planned project costs to execute stages of a selected project through a present time t, an actual cost (AC) parameter that reflects cumulative actual project costs for the stages of the selected project through the present time and a cumulative earned value (EV) parameter that reflects percentage completion of the selected project through the present time, associated with the selected project for at least first and second selected times during implementation of the selected project;

to perform an earned value management analysis for the selected project for a selected time interval between the first and second selected times; and to provide at least one graphical display of an estimate of at least one of the PV parameter, the AC parameter and the EV parameter as a function of time in the selected time interval.

10. The system of claim 8, wherein said computer is further programmed:

to provide a lexicon that provides a correspondence of at least one of categories, groups of subjects within categories, and individual subjects, within said reports, and at least one of categories, groups of subjects within categories, and individual subjects for a selected reporting system that provides information similar to information provided by said system; and to provide a link between at least one of a category, a group of subjects within a category and an individual subject, within said system, and at least one of a corresponding category, a corresponding group of subjects within a category and a corresponding individual subject, within the selected reporting system so that specification of at least one of a category, a group of subjects within a category and an individual subject, within said system, identifies and displays at least one of a corresponding category, a corresponding group of subjects within a category and a corresponding individual subject, within the selected reporting system.

11. The system of claim 8, wherein said computer is further programmed to provide a tool bar for said user that links at least two specified components or at least two specified data sets that are related to each other.

12. A system for managing a project that includes a plurality of tasks and a plurality of workers, the system comprising providing a computer that is programmed:

to provide a searchable database and associated system that provides and visually displays information comprising:

to provide a monthly report that reports, at each of at least two times including the present time, present status of each of a plurality of specified tasks and compares the present status of each specified task with an initial estimate of status of the corresponding specified task at the present time;

to provide a task plan report that provides more detail on, and allows quantitative analysis on, at least one of the specified tasks;

to provide a schedule report that provides at least one of a graphical presentation and an alphanumerical presentation of information comparing an schedule of completion of the at least one specified task with a present stage of completion of the at least one specified task;

to provide a budget report that provides at least one of a graphical presentation and an alphanumerical presentation of information on at least one of: full cost summary to date of at least one of the specified tasks; worker full time equivalent to date for each worker associated with the at least one specified task; labor costs expended to date for each worker associated with the at least one specified task; travel costs expended to date for each worker associated with the at least one specified task; and overhead allocated to date for each worker associated with the at least one specified task; and a risk management report indicating at least one risk that has been accepted to date to complete the at least one specified task, indicating at least one risk mitigation measure that is proposed or implemented to mitigate the at least one risk, and providing an estimate of present risk that the at least one specified task will not be completed as initially estimated, where the at least one risk is drawn from a set of risks comprising a technical risk concerning performance of at least one product developed as part of the project, a schedule risk that a component of the project will not be completed and delivered according to an anticipated schedule, a budget risk that a component of the project will not be completed and delivered within an accepted budget, a management risk that one or more accepted milestones will not be met; an in-house worker skills mix risk that in-house personnel with one or more critical skills will not be available to work on the project; a contractor skills mix risk that contractor personnel with one or more critical skills will not be available to work on the project; an objectives risk that one or more milestones or goals will not be met within an acceptable time frame, wherein the computer is further programmed:

to provide or receive at least one parameter corresponding to each of at least K alternative investments of resources in K respective projects, numbered k=1, ..., K (K≧2), the at least one parameter being drawn from a group of project-defining parameters comprising, for each of the alternative projects: at least one special technical requirement for completion of the alternative project; estimated cost of the alternative project; estimated foregone-opportunity cost of the alternative project; estimated schedule for completion of the alternative project; estimated economic return associated with completion of the alternative project; estimated non-economic return associated with completion of the alternative project; and estimated skill mix required for personnel working on the alternative project; and to perform at least one simulation of a scenario associated with completion of the alternative project.

13. The system of claim 12, wherein said computer is further programmed to perform said at least one simulation of said scenario associated with completion of each of said alternative projects, by a process comprising:

providing a projected interest rate i(proj) for each of a selected number N of consecutive periods in the future, numbered n=1, ..., N (N≧1);

providing an estimated cost $C_n(k)$ and an estimated return $R_n(k)$ for said alternative project number k, for k=1, ..., K, for the future period number n;

computing a time value of return TVR(i(proj);k) for the N periods, using the estimated costs $C_n(k)$, the estimated returns $R_n(k)$, and the projected interest rate i(proj)=i(k) for said alternative project number k according to a relation $$TVR(i(proj);k) = \sum_{n=1;}^{N} \{-C_n(k) + R_n(k)\}/((1+i(k))^n;$$

comparing the time value of return TVR(i(proj);k) for said alternative project number k; and selecting said alternative project, number k=k0, having a maximum time value of return TVR(i(proj);k=k0).

14. The system of claim 12, wherein said computer is further programmed to perform said at least one simulation of said scenario associated with completion of said project, by a process comprising:

providing an estimated cost $C_n(k)$ and an estimated return $R_n(k)$ for said project for each of N future periods, numbered n=1, . . . , N (N≧1) for each of said alternative projects number k;

estimating a largest finite imputed interest value i0(k) for which a computed time value of return, defined as $$CTVR(i0(k)) = \sum_{n=1}^{N} (-C_n(k) + R_n(k))/(1 + i0(k))^n,$$

is 0;

comparing the imputed interest value i0(k) for each of said alternative projects; and selecting said alternative project, number k=k0, having a maximum imputed interest value i0(k=k0).

15. The system of claim 12, wherein said computer is further programmed to perform said at least one simulation of said scenario associated with completion of said project, by a process comprising:

providing an estimated cost $C_n(k)$ and an estimated return $R_n(k)$ for said project for each of N future periods, numbered n=1, . . . , N (N≧1) for each of said alternative projects number k;

estimating a largest finite imputed interest value i0(k) for which a computed time value of return, defined as $$CTVR(i0(k)) = \sum_{n=1}^{N} (-C_n(k) + R_n(k))/(1 + i0(k))^n,$$

is 0;

comparing the imputed interest value i0(k) for each of said alternative projects; and selecting said alternative project, number k=k0, having a minimum imputed interest value i0(k=k0).

16. The system of claim 12, wherein said computer is further programmed to perform said at least one simulation of said scenario associated with completion of said project, by a process comprising:

providing an estimated cost $C_n(k)$ and an estimated return $R_n(k)$ for said project for each of N future periods, numbered n=1, . . . , N (N≧1);

for each of said alternative projects, estimating a smallest imputed interest value i0 for which a computed time value of return, defined as $$CTVR(i0(k); k) = \sum_{n=1}^{N} (-C_n(k) + R_n(k))/(1 + i0(k))^n,$$

is 0;

comparing the imputed interest value i0(k) for each of said alternative projects, number k, with an estimated projected interest rate i(proj) for the N future periods; and declining to implement at least one of said alternative projects number k when the imputed interest rate i0(k) is less than the projected interest rate i(proj).

17. A system for managing a project that includes a plurality of tasks and a plurality of workers, the system comprising providing a computer that is programmed:

to provide a searchable database and associated system that provides and visually displays information comprising:

a monthly report that reports, at each of at least two times including the present time, present status of each of a plurality of specified tasks and compares the present status of each specified task with an initial estimate of status of the corresponding specified task at the present time;

a task plan report that provides more detail on, and allows quantitative analysis on, at least one of the specified tasks;

a schedule report that provides at least one of a graphical presentation and an alphanumerical presentation of information comparing an schedule of completion of the at least one specified task with a present stage of completion of the at least one specified task;

a budget report that provides at least one of a graphical presentation and an alphanumerical presentation of information on at least one of: full cost summary to date of at least one of the specified tasks; worker full time equivalent to date for each worker associated with the at least one specified task; labor costs expended to date for each worker associated with the at least one specified task; travel costs expended to date for each worker associated with the at least one specified task; and overhead allocated to date for each worker associated with the at least one specified task;

a risk management report indicating at least one risk that has been accepted to date to complete the at least one specified task, indicating at least one risk mitigation measure that is proposed or implemented to mitigate the at least one risk, and providing an estimate of present risk that the at least one specified task will not be completed as initially estimated, where the at least one risk is drawn from a set of risks comprising a technical risk concerning performance of at least one product developed as part of the project, a schedule risk that a component of the project will not be completed and delivered according to an anticipated schedule, a budget risk that a component of the project will not be completed and delivered within an accepted budget, a management risk that one or more accepted milestones will not be met; an in-house worker skills mix risk that in-house personnel with one or more critical skills will not be available to work on the project; a contractor skills mix risk that contractor personnel with one or more critical skills will not be available to work on the project; an objectives risk that one or more milestones or goals will not be met within an acceptable time frame, wherein said computer is further programmed:

to permit running of at least one test case that executes a selected portion of software that is part of the computer's program and provides at least one computed result;

to compare the at least one computed result of execution or presentation of the test case with at least one corresponding known, correct result; and when the at least one computed result does not substantially agree with the at least one corresponding known, correct result, to note and display this non-agreement in an error log, and to preserve the non-agreement in the error log in a read-only format that cannot be modified, cannot be added to, and cannot be deleted.

18. The system of claim 17, wherein said computer is further programmed:
to permit access by at least one authorized user to said computer in order to modify and to perform further tests on said selected portion of said software;
to permit the at least one authorized user to modify said selected portion of said software to attempt to provide a software fix that removes said non-agreement; and
to provide and display an entry in said error log indicating the software fix provided by the authorized user and indicating where the software fix is located in the modified software.

19. A system for managing a project that includes a plurality of tasks and a plurality of workers, the system comprising providing a computer that is programmed:
to provide a searchable database and associated system that provides and visually displays information comprising:
a monthly report that reports, at each of at least two times including the present time, present status of each of a plurality of specified tasks and compares the present status of each specified task with an initial estimate of status of the corresponding specified task at the present time;
a task plan report that provides more detail on, and allows quantitative analysis on, at least one of the specified tasks;
a schedule report that provides at least one of a graphical presentation and an alphanumerical presentation of information comparing an schedule of completion of the at least one specified task with a present stage of completion of the at least one specified task;
a budget report that provides at least one of a graphical presentation and an alphanumerical presentation of information on at least one of: full cost summary to date of at least one of the specified tasks; worker full time equivalent to date for each worker associated with the at least one specified task; labor costs expended to date for each worker associated with the at least one specified task; travel costs expended to date for each worker associated with the at least one specified task; and overhead allocated to date for each worker associated with the at least one specified task;
a risk management report indicating at least one risk that has been accepted to date to complete the at least one specified task, indicating at least one risk mitigation measure that is proposed or implemented to mitigate the at least one risk, and providing an estimate of present risk that the at least one specified task will not be completed as initially estimated, where the at least one risk is drawn from a set of risks comprising a technical risk concerning performance of at least one product developed as part of the project, a schedule risk that a component of the project will not be completed and delivered according to an anticipated schedule, a budget risk that a component of the project will not be completed and delivered within an accepted budget, a management risk that one or more accepted milestones will not be met; an in-house worker skills mix risk that in-house personnel with one or more critical skills will not be available to work on the project; a contractor skills mix risk that contractor personnel with one or more critical skills will not be available to work on the project; an objectives risk that one or more milestones or goals will not be met within an acceptable time frame, wherein said computer is further programmed:
to require a user of the system to submit a system user identity indicium to authenticate an identity of the user;
to accept, as the system user identity indicium, at least one of a selected group of biometric indicia presented by the user, comprising at least one of at least one of a fingerprint of the user, a voiceprint of the user, a retinal scan of the user, a scan of blood transport channels in a selected region of the user's body, a scan of visible features of a selected portion of the user's face, and a sample of handwriting of the user; and
when the user's identity is authenticated, to receive from the user a specification of information the user seeks, and to indicate one or more use permissions, drawn from a group of permissions comprising permission to read, permission to add to the information, permission to modify the information, and permission to selectively delete at least a portion of the information.

20. A system for managing a project that includes a plurality of tasks and a plurality of workers, the system comprising providing a computer that is programmed:
to provide a searchable database and associated system that provides a visuay display;
to provide a monthly report that reports, at each of at least two times including the present time, present status of each of a plurality of specified tasks and compares the present status of each specified task with an initial estimate of status of the corresponding specified task at the present time;
to provide a task plan report that provides more detail on, and allows quantitative analysis on, at least one of the specified tasks;
to provide a schedule report that provides at least one of a graphical presentation and an alphanumerical presentation of information comparing an schedule of completion of the at least one specified task with a present stage of completion of the at least one specified task;
to provide a budget report that provides at least one of a graphical presentation and an alphanumerical presentation of information on at least one of: full cost summary to date of at least one of the specified tasks; worker full time equivalent to date for each worker associated with the at least one specified task; labor costs expended to date for each worker associated with the at least one specified task; travel costs expended to date for each worker associated with the at least one specified task; and overhead allocated to date for each worker associated with the at least one specified task;
to provide or receive at least one parameter corresponding to each of at least K alternative investments of resources in K respective projects, numbered k=1, . . . , K (K≧2), the at least one parameter being drawn from a group of project-defining parameters comprising, for each of the alternative projects: at least one technical requirement for completion of the alternative project; estimated cost of the alternative project; estimated foregone-opportunity cost of the alternative project; estimated schedule for completion of the alternative project; estimated economic return associated with completion of the alternative project; estimated non-economic return associated with completion of the alternative project; and estimated skill mix required for workers working on the alternative project; and
to perform at least one simulation of a scenario associated with completion of the alternative project.

21. A system for managing a project that includes a plurality of tasks and a plurality of workers, the system comprising providing a computer that is programmed:

to provide a searchable database and associated system that provides a visual display;

to provide a monthly report that reports, at each of at least two times including the present time, present status of each of a plurality of specified tasks and compares the present status of each specified task with an initial estimate of status of the corresponding specified task at the present time;

to provide a task plan report that provides more detail on, and allows quantitative analysis on, at least one of the specified tasks;

to provide a schedule report that provides at least one of a graphical presentation and an alphanumerical presentation of information comparing an schedule of completion of the at least one specified task with a present stage of completion of the at least one specified task;

to provide a budget report that provides at least one of a graphical presentation and an alphanumerical presentation of information on at least one of: full cost summary to date of at least one of the specified tasks; worker full time equivalent to date for each worker associated with the at least one specified task; labor costs expended to date for each worker associated with the at least one specified task; travel costs expended to date for each worker associated with the at least one specified task; and overhead allocated to date for each worker associated with the at least one specified task;

to require a user of said system to submit a system user identity indicium to authenticate an identity of the user;

to accept, as the system user identity indicium, at least one of a selected group of biometric indicia presented by the user, comprising at least one of at least one of a fingerprint of the user, a voiceprint of the user, a retinal scan of the user, a scan of blood transport channels in a selected region of the user's body, a scan of visible features of a selected portion of the user's face, and a sample of handwriting of the user; and when the user's identity is authenticated, to receive from the user a specification of information the user seeks, and to indicate one or more use permissions for the user, drawn from a group of permissions comprising permission to read, permission to add to the information, permission to modify the information, and permission to selectively delete at least a portion of the information.

22. A system for managing a project that includes a plurality of tasks and a plurality of workers, the system comprising providing a computer that is programmed:

to provide a searchable database and associated system that provides a visual display;

to provide a monthly report that reports, at each of at least two times including the present time, present status of each of a plurality of specified tasks and compares the present status of each specified task with an initial estimate of status of the corresponding specified task at the present time;

to provide a task plan report that provides more detail on, and allows quantitative analysis on, at least one of the specified tasks;

to provide a schedule report that provides at least one of a graphical presentation and an alphanumerical presentation of information comparing an schedule of completion of the at least one specified task with a present stage of completion of the at least one specified task;

to provide a budget report that provides at least one of a graphical presentation and an alphanumerical presentation of information on at least one of: full cost summary to date of at least one of the specified tasks; worker full time equivalent to date for each worker associated with the at least one specified task; labor costs expended to date for each worker associated with the at least one specified task; travel costs expended to date for each worker associated with the at least one specified task; and overhead allocated to date for each worker associated with the at least one specified task;

to permit running of at least one test case that executes a selected portion of software that is part of the computer's program and that provides at least one computed result;

to compare the at least one computed result of execution or presentation of the test case with at least one corresponding known, correct result; and when the at least one computed result does not agree with the at least one corresponding known, correct result, to note and display this non-agreement in an error log, and to preserve the non-agreement in the error log in a read-only format that cannot be modified, cannot be added to, and cannot be deleted.

\* \* \* \* \*